US012662246B1

(12) United States Patent
Diaz

(10) Patent No.: US 12,662,246 B1
(45) Date of Patent: Jun. 23, 2026

(54) AIRCRAFT WITH ENGINE DROPPING SYSTEM

(71) Applicant: JetZero, Inc., Long Beach, CA (US)

(72) Inventor: Raphael Diaz, Vacaville, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 19/230,832

(22) Filed: Jun. 6, 2025

(51) Int. Cl.
B64D 1/02 (2006.01)
B64C 1/16 (2006.01)
B64C 39/10 (2006.01)

(52) U.S. Cl.
CPC .................. B64D 1/02 (2013.01); B64C 1/16 (2013.01); B64C 39/10 (2013.01); B64C 2039/105 (2013.01)

(58) Field of Classification Search
CPC . B64D 1/02; B64D 1/00; B64D 27/08; B64D 27/14; B64D 27/20; B64C 1/16; B64C 39/10; B64C 2039/105
See application file for complete search history.

(56) References Cited

U.S. PATENT DOCUMENTS 6,170,141 B1     1/2001  Rossway et al.
7,618,005 B1 *  11/2009  Tafoya ....................  B64C 1/064
                                                                            244/36

8,322,651 B2    12/2012  Levert et al.
9,783,313 B2    10/2017  Lacko
11,117,667 B1 *   9/2021  McGann ................  B64U 10/13
2010/0043450 A1 *  2/2010  Marche ...................  B64C 39/10
                                                                            60/797
2011/0226899 A1 *  9/2011  Cazals .....................  B64C 1/22
                                                                            244/118.1
2017/0240281 A1 *  8/2017  Veto .........................  B64C 13/16
2018/0362171 A1 *  12/2018  Curchod ...............  B64D 29/06
2019/0322391 A1    10/2019  Lamadon

FOREIGN PATENT DOCUMENTS

CN           208200266 U     12/2018
FR              2909358 A1 *   6/2008  .............  B64C 39/10
KR         20030009886 A       2/2003
WO     WO-2012175843 A1 *  12/2012  ...........  B64D 27/402

OTHER PUBLICATIONS

Machine Translation of FR-2909358-A1, Cazals Olivier, Jun. 6, 2008 (Year: 2008).*

* cited by examiner

*Primary Examiner* — Kimberly S Berona
*Assistant Examiner* — Katherine June Walter
(74) *Attorney, Agent, or Firm* — Jeffrey Schox

(57) ABSTRACT

An aircraft with an engine dropping mechanism is disclosed. The aircraft includes at least an engine, wherein the at least engine is top mounted to the aircraft; a main body; at least an engine support structure mechanically connecting the at least an engine with the main body; and the well extending from an upper surface of the aircraft toward a lower surface of the aircraft, wherein the well is configured to allow for a vertical displacement of the at least an engine from the at least an engine support structure.

20 Claims, 8 Drawing Sheets

204b

212

204a

200

AIRCRAFT WITH ENGINE DROPPING SYSTEM

FIELD OF THE INVENTION

The present invention generally relates to the field of aircraft engine support system. In particular, the present invention is directed to an aircraft with an engine dropping system.

BACKGROUND

Conventional aircraft designs typically mount engines beneath the wing or along the fuselage, with engine attachment points secured through pylons or integrated support structures. In the event of an in-flight emergency, such as severe engine failure, fire, or structural damage, conventional aircraft lack a dedicated mechanism for safely removing an engine. Instead, engine detachment, if it occurs, is often uncontrolled and results from structural failure rather than an intentional, controlled release. The inability to safely and selectively detach an engine can present operational risks, including asymmetrical aerodynamic forces, excessive drag, and potential damage to the aircraft's structure.

SUMMARY OF THE DISCLOSURE

In some aspects, the techniques described herein relate to an aircraft with a well for engine displacement, the aircraft including: at least an engine, wherein the at least engine is top mounted to the aircraft; a main body; at least an engine support structure mechanically connecting the at least an engine with the main body; and the well extending from an upper surface of the aircraft toward a lower surface of the aircraft, wherein the well is configured to allow for a vertical displacement of the at least an engine to or from the at least an engine support structure.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure relate to an aircraft with an engine dropping mechanism are disclosed. The aircraft includes at least an engine, wherein the at least engine is top mounted to the aircraft; a main body; at least an engine support structure mechanically connecting the at least an engine with the main body; and the well extending from an upper surface of the aircraft toward a lower surface of the aircraft, wherein the well is configured to allow for a vertical displacement of the at least an engine to or from the at least an engine support structure.

Figure 1:
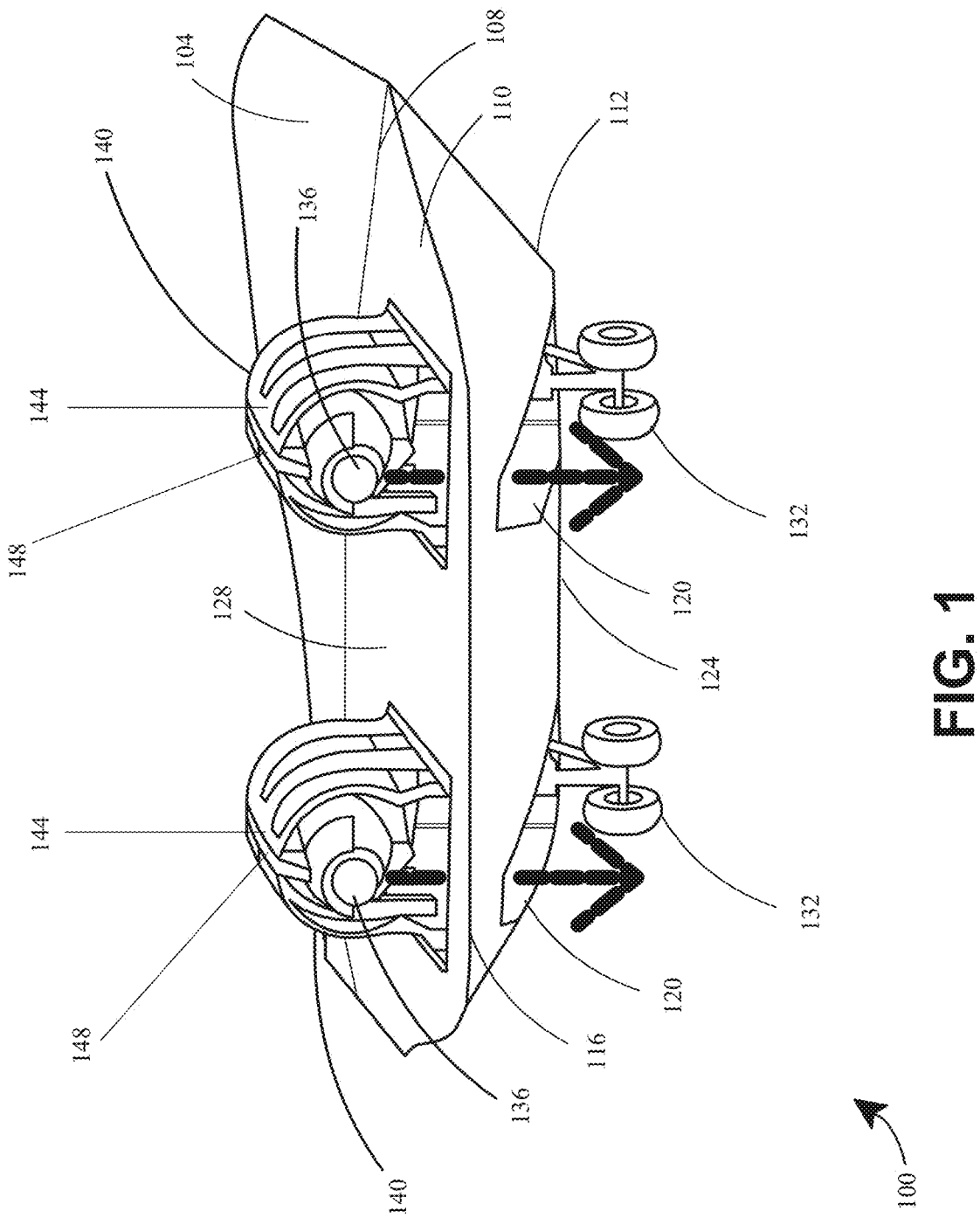
FIG. 1 illustrates a rear portion of an aircraft in accordance with the subject disclosure.

Referring now to FIG. 1, an exemplary embodiment of a rear portion of an aircraft 100 is described. In one or more embodiments, aircraft 100 may include any aircraft as described in this disclosure. In one or more embodiments, aircraft 100 may include a blended wing body (BWB) aircraft, such as a BWB aircraft as described in reference to at least FIG. 6. In one or more embodiments, aircraft 100 may include a blended wing body aircraft 100 having a main body 104 and wings with no clear demarcation between the wings and the main body 104 along a leading edge of the aircraft 100. "Main body" for the purposes of this disclosure is a central structure of aircraft 100 in which passengers, personnel or cargo, landing gear and the like may be situated. For example, and without limitation, main body may include a passenger cabin, a cargo bay, and the like. In one or more embodiments, main body 104 may include a fuselage of aircraft 100. In one or more embodiments, fuselage may include main body 104 and a rear spar 108 within main body 104. In one or more embodiments, main body 104 may include a passenger compartment wherein passengers may be situated during flight. In one or more embodiments, BWB may include an outer mold line 112. In one or more embodiments, an outer mold line 112 of BWB may be formed by a carbon fiber material.

With continued reference to FIG. 1, aircraft 100 may include a rear spar 108 located within main body 104. Rear spar 108 may be configured to contain a pressure vessel. A "rear spar," as used herein, is the aft pressure bulkhead for a cabin pressure vessel. "Cabin pressure vessel" for the purposes of this disclosure refers to a sealed structure within aircraft. For example, and without limitation, cabin pressure vessel may include the passenger compartment of aircraft 100, main body 104 or a portion thereof, the cargo compartment of aircraft and the like. In one or more embodiments, a cabin pressure vessel may contain pressure within an aircraft 100 to allow for suitable conditions for passengers and aircraft personnel. In one or more embodiments, cabin pressure vessel may contain pressure within the aircraft 100 and allow for a pressure difference between the interior of the cabin pressure vessel and the exterior of aircraft 100. In one or more embodiments, main body 104 may include and/or be included within cabin pressure vessel. In one or more embodiments, rear spar 108 may be configured to contain a pressure within cabin pressure vessel. In one or more embodiments, rear spar 108 may be configured to form a portion of cabin pressure vessel. In one or more embodiments, rear spar 108 may be configured to form an aft portion of cabin pressure vessel. In one or more embodiments, rear spar 108 may serve as a structural component for cabin pressure vessel to contain the pressure within the cabin pressure vessel. In one or more embodiments, rear spar 108 may include rubs running longitudinally from an upper surface of aircraft to a lower surface of aircraft 100. In one or more embodiments, rear spar 108 may include a pressure bulkhead to contain the pressurized section of aircraft 100. In one or more embodiments, rear spar 108 may contain a structural element similar to that of a spar of an aircraft 100 wing. In one or more embodiments, rear spar may be located within an aft portion of main body 104 wherein rear spar 108 may be located closer to a tail or an aft portion 116 of aircraft 100. "Aft portion," for the purposes of this disclosure, refers to the back half of a component. For example, and without limitation, an aft portion of an aircraft may refer to back half of the aircraft, wherein the front of the aircraft may contain a nose and the rear of the aircraft may contain a tail. In one or more embodiments, aft portion may include a portion of a component spanning from the midsection until the back of the component. In one or more embodiments, rear spar 108 may be located within an aft portion of main body 104 wherein rear spar may be located in a back half of main body 104. In one or more embodiments, ribs may be orthogonal to rear spar 108 wherein ribs may be positioned within aft portion 116 of aircraft 100 and extended in a direction towards a nose of aircraft 100. In one or more embodiments, stringers and/or frames may run orthogonal to ribs. In one or more embodiments, rear spar 108 may serve as a pressure bulkhead for a pressure vessel. "Pressure bulkhead" for the purposes of this disclosure is a component of an aircraft 100 airframe that serves to contain the pressurized section of an aircraft 100 and separate the pressurized section from other non-pressurized areas. For example, and without limitation, a pressurized section may include a main body 104 wherein passengers may be located within main body 104. In one or more embodiments, rear spar 108 may serve as a rear pressure bulkhead of aircraft 100 wherein main body 104 may be contained by the structure provided by rear spar 108. In one or more embodiments, aircraft 100 may include a pressure vessel wherein rear spar 108 may be configured to contain the pressure vessel or a portion thereof. Pressure vessel may be described in further detail below such as in reference to FIG. 2.

With continued reference to FIG. 1, in one or more embodiments, aircraft 100 may contain a convergent aft center body 110 aft of rear spar 108. In one or more embodiments, main body 104 may contain a passenger compartment and convergent aft center body 110 wherein rear spar 108 separates passenger compartment from convergent aft center body 110. "Convergent aft center body" for the purposes of this disclosure refers to portion of main body 104 situated aft of rear spar 108. In one or more embodiments, convergent aft center body 110 may be located within an aft portion 116 of aircraft 100. In one or more embodiments, convergent aft center body may contain a tapering shape. In one or more embodiments, convergent aft center body 110 may include an unpressurized portion of aircraft 100. In one or more embodiments, aircraft components such as propulsors, landing gear and the like may be located on convergent aft center body 110. In one or more embodiments, a fuselage and/or main body of aircraft may be divided into at least two sections wherein a first section may include a passenger compartment and a second section may include a convergent aft center body 110 located aft of the passenger compartment. In one or more embodiments, rear spar 108 may separate convergent aft center body 110 from passenger compartment. In one or more embodiments, convergent aft center body 110 may increase in thickness from rear spar 108 in a direction towards a tail or trailing edge of aircraft 100. In one or more embodiments, thickness may be defined as a length between an upper surface of aircraft 100 in a direction of lower surface of aircraft 100. In one or more embodiments, convergent aft center body 110 may predominantly take the form of a triangular prism wherein an edge of the prism may be located at or near a tail or trailing edge of aircraft 100 and the lateral faces of the prism may contain an upper and lower surface of aircraft 100. In one or more embodiments, aircraft 100 may include a main body 104 wherein convergent aft center body 110 may be located within an aft portion of main body 104. In one or more embodiments, convergent aft center body 110 may include a frame, wherein the frame may provide for the primary support of convergent aft center body 110. In one or more embodiments rear spar may be configured to provide support to convergent aft center body 110 and/or main body 104. In one or more embodiments, convergent aft center body 110 may further include stringers running orthogonally to frame and configured to provide structural support in an orthogonal direction and to distribute loads along frame. "Stringer" for the purposes of this disclosure is a structural component configured to provide structural support in a direction orthogonal to a frame of the aircraft. In one or more embodiments, stringers may be used to prevent movement of frames within an aircraft structure. In one or more embodiments, stringers may provide for additional structural elements in which an outer mold line skin of aircraft may be adhered to. In one or more embodiments, frame may further include ribs connected to the frames to provide additional structural support within convergent aft center body 110.

With continued reference to FIG. 1, aircraft 100 includes a well 120. For the purposes of this disclosure, a "well" is a structural recess, passage, or cavity formed within an aircraft body. In some embodiments, well 120 may be configured to provide a defined spatial corridor for the movement or positioning of a component of an aircraft 100. In some embodiments, aircraft 100 may include one or more wells 120 situated on a lower surface 124 of convergent aft center body 110. In one or more embodiments, one or more wells 120 may be situated aft of rear spar 108. In one or more embodiments, one or more wells 120 may be situated aft of rear spar 108 and on convergent aft center body 110. In one or more embodiments, a location aft of rear spar 108 may be situated on convergent aft center body 110. "Gear well" for the purposes of this disclosure is an extruded portion of aircraft 100 that is configured to house a landing gear component. In one or more embodiments, well 120 may extend from a lower surface of an outer mold line 112 of aircraft 100 and/or convergent aft center body 110 in a direction of an upper surface of convergent aft center body 110 and/or aircraft 100. In one or more embodiments, convergent aft center body 110 may be wrapped in an outer mold line 112 skin wherein the outer mold line 112 skin may include the outer surface of an aircraft 100. In one or more embodiments, well 120 may include a through hole that extends past the upper surface and the lower surface of aircraft 100. In one or more embodiment, well 120 may include a portion of aircraft 100 that is accessible to a frame, rib and/or stringer of convergent aft center body 110 or rear spar 108. In one or more embodiments, well 120 may provide for a housing of a landing gear wherein in a retract position, landing gear may be situated inside and within the boundary of the outer mold line 112 of the aircraft 100. In one or more embodiments, in a retracted position landing gear may be situated within well 120 wherein landing gear may not extend past a lower surface of aircraft 100. In one or more embodiments, landing well 120 may serve as an enclosed space or compartment in which landing gear may be situated during flight. In one or more embodiments, landing gear may be situated within well 120 and/or convergent aft center body 110 during flight in order to increase the aerodynamic efficiency of aircraft 100 during flight. In one or more embodiments, more than one landing wells 120 may be situated on a lower surface 124 of convergent aft center body 110 and/or aircraft 100. In one or more embodiments, more than one wells 120 may be situated a similar distance from rear spar 108 or a tail or trailing edge of aircraft 100 wherein more than one wells 120 may be parallel to one another about an axis. In one or more embodiments, at least one propulsor is located over at least one well 120 of the one or more wells 120. In one or more embodiments, gear wells may be located on or within an aft portion of main body 104. In one or more embodiments, well 120 may extend from a lower surface 124 of convergent aft center body 110 in a direction of upper surface 128 of tail. In one or more embodiments, well 120 may extend from a lower surface 124 of convergent aft center body 110 through an upper surface 128 of convergent aft center body 110 wherein convergent aft center body 110 may include a through hole from an upper surface 128 of convergent aft center body 110 to a lower surface 124 of convergent aft center body 110. In one or more embodiments, rear spar 108 may provide a structure for gear well. In one or more embodiments, gear well may be situated near rear spar on convergent aft center body 110. In one or more embodiments, well 120 may include a through hole extending from a lower surface of aircraft 100 through an upper surface of aircraft 100.

With continued reference to FIG. 1, in some embodiments, rear spar 108 may include structural element such as a rib within main body 104. In one or more embodiments, rear spar 108 may serve as a structural component for one or more aircraft 100 components such as but not limited to, main body 104, a landing gear system 132, an engine 136, and the like.

With continued reference to FIG. 1, well 120 extends from an upper surface of aircraft 100 toward a lower surface of the aircraft 100. Well 120 is configured to allow vertical displacement of at least an engine 136 to or from engine support structure 140. In some embodiments, a configuration of well 120 may allow for unobstructed vertical displacement of engine 136 by ensuring that internal aircraft components (e.g., structural spars, systems conduits, or cargo and passenger compartments) do not interfere with the movement of the engine 136 within a defined volume of the well 120. In some embodiments, dimensions of well 120 may be based on geometry of engine 136, including its width, height, and any nacelle or mounting hardware (e.g., engine support structure 140) attached to it. In a non-limiting example, well 120 may be shaped to closely conform to a profile of engine 136 to reduce excess volume and maintain structural efficiency within the aircraft 100. In another non-limiting example, well 120 may include structural reinforcements along its boundaries to preserve the integrity of the surrounding airframe and to support localized loads generated during engine movement or retention. In some embodiments, well 120 may incorporate guide rails, retention brackets, or isolator mounts to facilitate controlled movement of engine 136 and to mitigate vibrational or aerodynamic loads transmitted during displacement. In certain embodiments, well 120 may be co-located with or integrated into other aircraft structures, such as a landing gear bay (e.g., gear well) or a service access tunnel. In some embodiments, well 120 may be equipped with removable panels or access doors to allow inspection, maintenance, or the passage of lifting mechanisms or dropping mechanisms.

With continued reference to FIG. 1, aircraft 100 includes a landing gear system 132. For the purposes of this disclosure, a "landing gear system" is a structural assembly configured to support the weight of an aircraft when in contact with the land. In some embodiments, landing gear system 132 may occupy gear well during flight. In one or more embodiments, BWB aircraft may include a landing gear system 132, the landing gear system 132 having a nose gear disposed proximate a front of the aircraft 100, the nose gear controllably movable between a first position in which the nose gear is retracted and/or at an upper limit, and a second position in which the nose gear is extended and/or at a lower limit. "Retracted" for the purposes of this disclosure refers to a positioning of one or more components of the landing gear system, wherein the components are not extended to their maximum capable length. In a non-limiting example, a component may be retracted wherein the component may extend outside of the outer mold line 112 but only a portion of its maximum capable length. Continuing, the component may be retracted when the component only extended half of its capable length. In a first position, nose gear may be retracted or stowed away within blended wing body and/or a main body 104 of the BWB. Nose gear may include a hinge, a swingarm, or any folding mechanism that may fold nose gear to store away into BWB and/or main body 104. In second position, nose gear may extend at or past a ground surface. "Extended" for the purposes of this disclosure is a positioning of one or more landing gear components outside of the outer mold line 112 wherein the components extend at least a portion of their maximum length. For example, a landing gear system 132 may be extended wherein a component may extend a portion or the entirety of the maximum capable length. In one or more embodiments, a landing gear system 132 may be extended and/or situated at an upper limit and a lower limit wherein the upper limit denotes the minimum length at which the landing gear may extend outside of the BWB body and still remain functional for use, while the lower limit may denote the maximum length at which the landing gear system 132 may be extended. In one or more embodiments, an upper limit may indicate a landing gear that is extended outside of BWB; however the landing gear is extended as minimal as possible while still allowing for use of the landing gear for during takeoff and landing. In one or more embodiments, a lower limit may indicate the maximum allowable extension of the landing gear system 132 wherein the landing gear system 132 is extended its maximum allowable length. Landing gear system 132 may further include a main gear disposed proximate a rear of the aircraft 100, the main gear controllably movable between a third position, in which the main gear is extended and/or located at a lower limit, and a fourth position, in which the main gear is retracted and/or located at an upper limit, wherein, in a ground position, the nose gear is in the first position and main gear is in the third position and a fuselage of the aircraft 100 is substantially level with the ground. In a third position, main gear may be extended at the same length as nose gear. In some embodiments, third position includes a position wherein main gear is extended at or below ground surface relative to nose gear. In a fourth position main gear may be retracted wherein main gear is not fully extended. This may include main gear being partially extended wherein main gear is at or below ground surface. In an angle-of-attack (AOA) position, the nose gear may be in the second position and the main gear is in the fourth position and the fuselage of the aircraft 100 may be rotated to a positive AOA with respect to the ground. In one or more embodiments, in a high lift position, the nose gear may be in the second position and the main gear may be in the fourth position and the fuselage of the BWB is rotated to a positive deck angle with respect to the ground. In one or more embodiments, in a high lift position, the flaps and slats of an aircraft may be extended to allow for lift of the aircraft. In one or more embodiments, a high lift position may indicate a configuration of various components of an aircraft that will allow for flight and/or takeoff of the aircraft. "Deck angle" for the purposes of this disclosure is an angle between a passenger deck (or an arbitrary fuselage reference plane) and a ground or water level surface. In one or more embodiments, a positive deck angle refers to an angle of an aircraft wherein the nose of the aircraft may be situated above a tail of the aircraft with respect to a ground surface. In one or more embodiments, an aircraft during takeoff may contain a positive deck angle. In one or more embodiments, in a high lift position, BWB may contain a positive deck angle due to the configuration of the landing gear. In some embodiments, BWB may contain landing gear system 132 configured to shorten required takeoff field length and/or landing field length. In some cases, BWB may be configured to land in areas that have a maximum takeoff field length of 8,340 ft and a required landing field length of 4,400 ft. In some embodiments, a required takeoff field length may be 8,340 ft or less. In some embodiments, required landing field length may be 4,400 ft, or less. For the purposes of this disclosure, a "landing field length" is the length of a runway on which an aircraft 100 is to land. For the purposes of this disclosure, a "required landing field length," is the length of the shortest runway on which an aircraft 100 is configured to land. For the purposes of this disclosure, a "takeoff field length" is the length of a runway on which an aircraft 100 is to takeoff. For the purposes of this disclosure a "required takeoff field length" is the length of the shortest runway on which an aircraft 100 is configured to be able to safely takeoff from. In one or more embodiments, landing gear system 132 may include a nose gear disposed proximate a front of the aircraft 100, the nose gear controllably movable between a first position in which the nose gear is retracted, and a second position in which the nose gear is extended and a main gear disposed proximate a rear of the aircraft 100, the main gear controllably movable between a third position, in which the main gear is extended, and a fourth position, in which the main gear is retracted. In one or more embodiments, in a ground position, the nose gear may be in the first position and main gear may be in the third position and a fuselage of the aircraft 100 may be substantially level with the ground. In one or more embodiments, in an angle-of-attack (AOA) position, the nose gear may be in the second position and the main gear may be in the fourth position and the fuselage of the aircraft 100 is rotated to a positive AOA with respect to the ground. In one or more embodiments, in a first position nose gear may be retracted wherein nose gear is retracted and located within the outer mold line 112 of BWB. Additionally or alternatively, in a second position nose gear may be extended wherein nose gear may be located outside the outer mold line 112. In one or more embodiments, in a third position and in a fourth position, a portion of main gear may be situated and/or extended outside of well 120 and extend past a lower surface of aircraft 100. The main gear disclosed herein may be described as a "landing gear" throughout the disclosure.

With continued reference to FIG. 1, landing gear system 132 may include at least one main gear. In one or more embodiments, landing gear system 132 may include more than one main gear. In one or more embodiments, main gear may be situated within well 120. In one or more embodiments, main gear may be connected and/or fixed to rear spar 108. In one or more embodiments, main gear and/or landing gear may be mounted to the aft pressure bulkhead/rear spar 108 via substantial fittings that may receive pins, shafts, bolts, etc. that support the main landing gear components. In turn, these fittings may distribute the concentrated landing gear component loads into the more diffuse rear spar structure. These substantial fittings may be integral to the rear spar 108, but they are nevertheless added to the rear spar 108 for the purpose of mounting the main gear and not for being a rear spar. In one or more embodiments, main gear may be connected to a frame of convergent aft center body 110. In one or more embodiments, main gear may be connected to ribs of convergent aft center body 110. In one or more embodiments, rear spar 108 may be connected to ribs, wherein the ribs may be situated orthogonally to rear spar 108, wherein main gear may be connected to the ribs. In one or more embodiments, convergent aft center body 110 may include a plurality of ribs connected to and/or orthogonal to rear spar. In one or more embodiments, ribs may include longitudinal structural elements within convergent aft center body configured to provide a structure to convergent aft center body 110. In one or more embodiments, main gear may be connected to ribs of convergent aft center body 110. In one or more embodiments, each main gear may be situated into a different well 120. In one or more embodiments, in a retracted position, an entity of main gear may be situated within well 120. In one or more embodiments, main gear may be connected to one or more ribs of convergent aft center body 110. In one or more embodiments, main gear may contain a retracted position wherein in a retracted position main gear may be folded and situated within well 120. In one or more embodiments, in an extended position main gear may be extended and/or partially extended wherein main gear may be extended outside of well 120 and outside of a boundary created by an outer mold line 112 of aircraft 100. In one or more embodiments, in a retraced position, main gear may be situated within an aft portion of main body 104 and/or the pressure vessel. In one or more embodiments, in a retraced position, landing gear may be situated within a boundary created by rear spar 108. In one or more embodiments, main gear may be situated aft of a passenger cabin. In one or more embodiments, main gear may be situated behind wings of aircraft 100. In one or more embodiments, main gear may be situated between the wings of aircraft 100.

With continued reference to FIG. 1, landing gear system 132 may contain a predominantly triangular shape, wherein a nose gear may be situated at an apex of the triangle and the main gears may be situated at the bas ends of the triangle. In one or more embodiments, landing gear system 132 may contain a predominantly isosceles triangle shape wherein nose gear may be situated an equal horizontal and vertical distance from each main gear. Landing gear system 132 and extension of landing gear system 132 are described further in detail with respect to FIGS. 5A-C.

With continued reference to FIG. 1, aircraft 100 may include one or more engines 136 located on an upper surface 128 of convergent aft center body 110 and/or aft of rear spar 108. As used herein, an "engine" is a machine designed to convert one or more non-mechanical forms of energy into mechanical energy. In some embodiments, engine 136 may include any engines 136 as described in this disclosure. For example, engine 136 may include a propulsor including a fan, propellor, rotor, and the like. In some cases, an engine 136 may include one or more components of an engine (e.g., jet engine) and a motor (e.g., electric motor). Engine 136 may include any propulsion system, or motor described in this disclosure. In one or more embodiments, engine 136 may include an engine fueled by more than one fuel. Alternatively or additionally, in some embodiments, engine 136 may include a motor powered by electricity. In some cases. electricity may be derived from fuel storage as described in this disclosure. For example, in some cases, electricity may be generated from one or more of a generator, alternator or the like. Alternatively or additionally, in some cases, electricity may be produced by a fuel cell. In some embodiments, engine 136 may include an electric motor. Electric motor may be powered by one or more electricity sources, such as without limitation batteries and/ or fuel cells. Additional disclosure related to fuel cell technology may be found in U.S. patent application Ser. No. 17/478,824, entitled "BLENDED WING BODY AIRCRAFT WITH A FUEL CELL AND METHOD OF USE," filed on Sep. 17, 2021, and incorporated by reference, in its entirety, within this disclosure. In some cases, a fuel cell may provide steady state power to engine 136, such as for example, for cruise flight. Alternatively or additionally, a battery or another electricity source may provide supplemental power for climbing. In some cases, fuel cell may be configured to charge battery or another electricity source, when it produces excess power, for example during descent or ground operations. In one or more embodiments, engine 136 may include at least an engine 136 mechanically affixed to aircraft 100. In some cases, at least an engine 136 may be configured to propel aircraft 100 through a medium such as air. In some embodiments, at least an engine 136 may include at least an electric motor operatively connected with fuel cell. Alternatively or additionally, engine 136 may be powered by one or more batteries. Batteries may include any batteries described in this disclosure. Engine 136 may be operatively connected to fuel cell by way of electrical communication, for example through one or more conductors. In some cases, at least a fuel cell may be configured to power at least an electric motor of engine 136. In some embodiments, at least an engine 136 may include both a combustion engine and an electric motor. In some embodiments, at least an engine 136 may be attached to an upper aft surface of main body 104. In one or more embodiments, engine 136 may be located on or near an upper aft surface of convergent aft center body 110. In some embodiments, engine 136 may be positioned above at least a landing gear system 132. In one or more embodiments, engine 136 may be situated directly above well 120, such that a vertical axis of the engine 136 aligns substantially with a central axis or opening of the well 120. For the purposes of this disclosure, "directly above" refers to a spatial arrangement in which a first component is positioned along a substantially vertical axis relative to a second component, such that the first component lies in vertical alignment with the second component when viewed in a vertical plane. In a non-limiting example, by situating engine 136 directly above well 120, engine support structure 140 may be installed around or across an upper opening of the well 120. For example, and without limitation, this configuration may allow engine 136 to be rigidly supported during flight operations while also being aligned with well 120 for efficient vertical removal or detachment. The direct vertical relationship between engine 136 and well 120 can ensure that when dropping mechanism is actuated, the engine 136 can be released straight downward into the volume of the well 120 with minimal structural interference. In one or more embodiments, propulsor may be situated directly above well 120 wherein propulsor and gear well may be parallel about an axis. In one or more embodiments, gear well may include through hole as described in this disclosure wherein engine 136 may pass through the through hole. In one or more embodiments, gear well may be large enough to allow for propulsor to pass through in instances wherein landing gear system 132 is not situated within well 120. In one or more embodiments, engine 136 may be situated directly above well 120 wherein propulsor may be located at or near a first end of through hole and landing gear system 132 may be situated at or near a second end of through hole. In one or more embodiments, a surface of well 120 may be structurally reinforced in comparison to other portions of convergent aft center body 110 wherein gear well may allow for increased structural rigidity of landing gear system 132. In some embodiments, landing gear system 132 may be located forward to a location just aft of an aircraft's center of gravity and this location places the extended main gear beneath a cabin floor. Retracted main gear may be also stowed beneath the cabin floor. In this arrangement, a propulsion engines may remain behind a wing rear spar.

With continued reference to FIG. 1, in one or more embodiment, an engine support structure 140 as described below may be mechanically connected to well 120 or a surface of gear well. In one or more embodiments, a mechanical connection may include the use of screws, nuts, bolts, adhesives and/or the like. A "mechanical connection" for the purposes of this disclosure is a physical linkage between two or more components that allows the transmission of force, motion, or energy. In one or more embodiments, propulsor may be situated directly above gear well, wherein engine 136 may pass through well 120 in instances where propulsor is mechanically disconnected from engine support structure 140. In one or more embodiments, placement of engine 136 and landing gear within a similar section of convergent aft center body 110 and/or within a similar plane may allow for increased aerodynamic efficiency. In one or more embodiments, at least one engine 136 may be located over the at least one well 120 of the one or more wells 120. In some embodiments, engine 136 may be consistent with a propulsor. Additional disclosure related to engine 136 is described with respect to FIG. 6.

With continued reference to FIG. 1, in one or more embodiments, engine 136 may be mechanically connected to aircraft 100 through an engine support structure 140. In one or more embodiments, engine support structure 140 may provide for a mechanical connection of engine 136 to aircraft 100. In one or more embodiments, engine 136 may be connected to aircraft 100 by way of engine support structure 140. In some embodiments, engine support structure 140 may be mounted on top of fuselage or convergent aft center body 110. In one or more embodiments, engine support structure 140 may include a nacelle. In one or more embodiments, engine support structure 140 may be situated aft of rear spar 108 on an upper surface 128 of convergent aft center body 110. In one or more embodiments, engine support structure 140 may be situated aft of rear spar 108. In some embodiments, engine support structure 140 may be mounted to a top surface of fuselage and/or convergent aft center body 110. In some embodiments, engine support structure 140 may be mounted on top of the main body 104 of aircraft 100.

With continued reference to FIG. 1, an "engine support structure," as used herein, is a structure that connects an engine with the main body or frame of the aircraft. Engine support structure 140 mechanically connects at least an engine 136 with a main body. It may serve various purposes, like connecting the engine 136 with the fuselage and/or convergent aft center body, suppressing the vibrations of the engine 136 and distributing them safely to the whole aircraft 100 structure for a smooth flight. An engine support structure 140 may be a precision-based metal structure that is highly sturdy, as it has to balance the weight of the engine during different torque requirements. Engine support structure 140 may be constructed of any suitable material or combination of materials, including without limitation metal such as aluminum, titanium, or the like, polymer materials or composites, fiberglass, carbon fiber, or any other suitable material. As a non-limiting example, engine support structure 140 may be constructed from additively manufactured polymer material with a carbon fiber exterior; aluminum parts or other elements may be enclosed for structural strength, or for purposes of supporting, for instance, vibration, torque or shear stresses imposed by at least an engine 136. In some embodiments, the at least an engine support structure 140 may be configured to house at least a landing gear system 132. For the purposes of this disclosure, "house" refers to the structural and spatial arrangement in which one component is physically contained within, supported by, or integrated into another component. In a non-limiting example, engine support structure 140 may be designed to accommodate landing gear system 132 within its boundaries or framework, either fully or partially. In a non-limiting example, engine support structure 140, hoop structures and/or ribs may be aligned so that the aligned engine support structure 140, hoop structures and/or ribs can package landing gear system 132. In some embodiments, engine support structure 140 may include sides of a gear well. In a non-limiting example, sides of gear well may be two support ribs for engine 136. In some embodiments, landing gear system 132 may be aligned with engine 136. In one or more embodiments, sides of a gear well may include planar surfaces extending from an upper surface of aircraft in a direction of lower surface of aircraft. In one or more embodiments, sides of well may include walls of well that define a perimeter of well.

With continued reference to FIG. 1, engine support structure 140 includes a plurality of hoop structures 144. Each hoop structure 144 of a plurality of hoop structures 144 includes a horseshoe structure. In some embodiments, horseshoe structure may be located forward of a center of gravity to at least engine 136. Engine support structure 140 may include a plurality of hoop structures 144, wherein each hoop structure 144 of the plurality of hoop structures 144 may include a horseshoe structure located forward of center of gravity of at least an engine assembly of engine 136. A "hoop structure," as used herein, is an engine support structure 140 that at least partially wraps around an engine of an aircraft 100. In some embodiments, a hoop structure 144 may include a horseshoe structure. A "horseshoe structure," as used herein, is an arc-shaped engine support structure 140. Engine 136 is configured to be top mounted to aircraft 100. For the purposes of this disclosure, an engine 136 and/or engine is "top mounted" when the engine is connected to an aircraft 100 through a connection on top of the engine. In some embodiments, at least an engine 136 may be mounted to ribs at aft face of a pressure bulkhead. In some embodiments, at least an engine 136 may be mounted aft of a rear spar. In one or more embodiments, engine support structure 140 and/or engine 136 may include one or more horseshoe structures wherein the horseshoe structures may be configured to mount the one or more engines 136 on the BWB. In some embodiments, hoop structures 144 may be connected to ribs at aft face of a pressure vessel. In some embodiments, the ribs may include a gap or space between the ribs. In a non-limiting example, space between ribs can be preserved so that engine 136 can be easily removed for maintenance. In some embodiments, the ribs may be attached to a rear spar, such that, in a non-limiting example, weight of engine 136 can be transferred to engine support structure 140 which can be transferred to ribs, which, then, can be transferred to rear spar.

With continued reference to FIG. 1, in one or more embodiments, horseshoe structure may contain a predominantly horseshoe shape. In one or more embodiments, horseshoe structure may include a semicircular curve that wraps around engine 136 and rounded and/or curved ends at each end of the horseshoe structure. In one or more embodiments, the rounded and/or curved ends may allow for attachment of horseshoe structure on rear spear and/or aircraft 100. In one or more embodiments, additional engines 136 as described herein, may be mounted in way that support comes from the bottom of the at least an engine support structure 140. In some embodiments, aircraft 100 may include one or more engines 136, such as a first and second engine 136 mounted or top mounted to aircraft 100. In some embodiments, engine 136 may include a turbojet, turboprop, turbofan, ramjet, pulsejet, scramjet, electrical engine, and the like. For the purposes of this disclosure, a "turbofan" is a type of engine that generates thrust through a combination of jet propulsion and bypass air acceleration. In some embodiments, engines may be powered using fuel such as Jet A, Jet A1, Aviation gasoline (AVGAS), TS-1, Jet B, JP-8, JP-1, and the like.

With continued reference to FIG. 1, engine 136 and/or engine support structure 140 may be located on an upper surface of convergent aft center body 110. In one or more embodiments, engine 136 and/or horseshoe structure may be located on an opposed end of the one or more wells 120. In one or more embodiments, engine 136 and/or horseshoe structure may be located on opposing ends of convergent aft center body 110 wherein well 120 may be located on a lower surface 124 of convergent aft center body 110 and engine 136 may be located on an upper surface of convergent aft center body 110.

Still referring to FIG. 1, in one or more embodiments, engine 136, engine support structure 140 and and/or horseshoe structure may be located on an opposing upper surface 128 of convergent aft center body 110. In one or more embodiments, engine 136 may be located on top of well 120 wherein engine 136 may pass through well 120 in instances where well 120 may include a through hole through convergent aft center body 110. In one or more embodiments, in instances wherein landing gear system 132 and/or nose gear is extended, engine 136 may pass through well 120, or alternatively the through hole, and out of a lower surface 124 of convergent aft center body 110 and/or a lower surface of aircraft 100. In one or more embodiments, well 120 may allow for access to engine 136 and/or engine mount structure through well 120. In one or more embodiments, through hole may allow for removal of engine 136 from engine support structure 140 through well 120.

Still referring to FIG. 1, fuselage may include a plurality of ribs. In some embodiments, a rib may be the forming element of the structure of a wing. Ribs of aircraft 100 may include form-ribs, plate type ribs, closed-ribs, forged ribs, milled ribs, and the like. Ribs may be made of made out of wood, metal, plastic, composites, foam, and the like. Additionally, fuselage may include one or more spars. Spars may support flight loads and the weight of the wings while on the ground. Spars may be made of metal, wood, composite materials, and the like. Spars may run perpendicular to the ribs. A rib may be attached to a rear-most spar of the one or more spars. In one or more embodiments, rear spar 108 may be connected to and/or orthogonal to ribs. In one or more embodiments, ribs may be configured to contain a pressure vessel.

Still referring to FIG. 1, the plurality of hoop structures 144 of engine support structure 140 may resemble a horse-shoe and may be used to provide a vertical engine mount for engines and/or engines 136 mounted atop a blended wing body aircraft 100. A "vertical engine mount," a used herein, is a device configured to vertically restrain the position of an engine. An engine mount may include a rubber body, sleeve bushing, a bonded plate, a connection bolt, and the like. An engine mount may be made of steel chrome molybdenum, chromoly tubular steel, and the like. An engine mount may include a conical engine mount, dynafocal engine mount, bed mount, and the like. This may be in contrast to banjos fittings that have been conventionally used. In some embodiments, aircraft 100 may include first engine support structure 140 attached to a first engine 136 and a second engine support structure 140 attached to a second propulsion. In one or more embodiments, engine 136 may be consistent and/or include an engine.

With continued reference to FIG. 1, engine support structure 140 may include a beam 148. In some embodiments, beam 148 may be part of a horseshoe structure. In some embodiments, horseshoe structure may include a first half and a second half, wherein the first half and the second half are connected by beam 148. In some embodiments, top of engine 136 may be attached beam 148 of engine support structure 140. In some embodiments, engine 136 may be suspended from beam 148 engine support structure 140. In some embodiments, top of engine 136 may be attached to engine support structure 140. In some embodiments, engine 136 may be suspended from engine support structure 140. In some embodiments, engine support structure 140 may be mounted onto one or more wings of aircraft 100.

Still referring to FIG. 1, a plurality of hoop structures 144 may include two to three horseshoe structures; for example, with the left side of the horseshoe structures mounted to a first rib and the right side of the horseshoe structures mounted to a second rib. In an embodiments with two horseshoe structures, a first rib and second rib may be aft of and mounted to a rear spar 108, which may be used as a major structural element, and may allow for the addition of a thrust reverser to aircraft 100, as the design may provide a more open-ended structure. Each of the two horseshoe structures may be located forward of the center of gravity (CG) of proposal. Each of the two horseshoe structures may be located forward of the center of gravity (CG) of engine assembly. In an embodiment with three horseshoe structures, the third horseshoe structure may be located aft of the CG of the engine 136. In an embodiment with three horseshoe structures, the third horseshoe structure may be located aft of the CG of the engine assembly. Forward placement of the horseshoe structures relative to the CG of the engine and/or engine assembly may allow for a thrust reversal mechanism, also referred to as reverse thrust. "Thrust reversal," as used herein, is the temporary diversion of an aircraft 100 engine's thrust for it to act against the forward travel of the aircraft 100, providing deceleration. A thrust reversal mechanism may help slow down a jet aircraft just after touch-down, reducing wear on the brakes and enabling shorter landing distances. Aircraft 100 may include target-type thrust reversal mechanism, wherein a pair of hydraulically operated bucket or clamshell type doors are used to reverse the hot gas stream. For forward thrust, these doors form the pro-pelling nozzle of the engine. Aircraft 100 may include an internal thrust reversal mechanism, wherein deflector doors inside the engine shroud to redirect airflow through openings in the side of the nacelle. In a jet aircraft embodiment, a thrust reversal mechanism may be accomplished by causing the jet blast to flow forward. In some embodiments, the engine does not run or rotate in reverse; instead, thrust reversing devices are used to block the blast and redirect it forward. Thrust reversing devices may include a bucket type reverser, clamshell door reverser cold, stream reverser cold stream, pivoting doors reverser, and the like.

With continued reference to FIG. 1, plurality of hoop structures 144 may be coupled together by a shear support structure. A "shear support structure," for the purposes of this disclosure, is a structure that links one or more hoop structures 144 in shear. In some embodiments, shear support structure may be in the shape of a shell. In some embodi-ments, shear support structure may transmit engine thrust from one or more hoop structures 144 to the airframe. In some cases, it may be disadvantageous to provide openings in the shear support structure to permit the redirected airflow from a thrust reversal mechanism. Accordingly, in some embodiments, it is advantageous for hoop structures 144 and shear support structure to be located ahead of a thrust reversal mechanism. Accordingly, placement of two hoop structures 144 forward of an engine CG and/or engine assembly CG may allow for the inclusion of a thrust reversal mechanism. In some embodiments, use of two hoop struc-tures 144 with the aft-most hoop structure 144 located lightly aft of the CG of the fan core of the engine. This may allow for the thrust reversal mechanism to be placed aft of the shear support structure.

With continued reference to FIG. 1, in one or more embodiments, outer mold line 112 of aircraft 100 may include an outer mold line skin. "Outer mold line skin" for the purposes of this disclosure refers to a material that encapsulates the aircraft or a portion of the aircraft. In one or more embodiments, a surface of outer mold line skin may include the outer mold line or a portion thereof. In one or more embodiments, outer mold line skin 1 may protect the aircraft from outside elements, such as, but not limited to, rain, cold air, hot air and the like. In one or more embodi-ments, outer mold line skin may be used to contain pressure within the aircraft. In one or more embodiments, outer mold line skin may encapsulate an outer surface of aircraft 100. In one or more embodiments, outer mold line skin may include one or more materials suitable for flight. In one or more embodiments, outer mold line skin may include aluminum, an aluminum alloy and the like. In one or more embodi-ments, outer mold line skin may include a carbon fiber material. In one or more embodiments, rear spar, frames of rear spar, convergent aft center body 110, and/or any other structural components may contain carbon fiber material "Carbon fiber material" as described in this disclosure is a material including carbon fibers. The carbon fibers may be spooled into carbon strands.

With continued reference to FIG. 1, aircraft 100 may include a dropping mechanism. For the purposes of this disclosure, a "dropping mechanism" is a mechanism that is configured to enable controlled detachment and vertical movement of at least an engine to or from an engine support structure. Dropping mechanism may be configured to drop at least an engine 136 from engine support structure 140 through aircraft 100 when at least a landing gear system 132 is extended. In some embodiments, dropping mechanism may be configured to drop at least an engine 136 from engine support structure 140 through aircraft 100 when at least a landing gear system 132 is removed from aircraft 100. In some embodiments, dropping mechanism may be configured to selectively release and detach at least an engine 136 from an aircraft 100 during flight or ground operations. In some embodiments, dropping mechanism may be configured to drop at least an engine 136 to pass through a gear well of at least a landing gear system 132. As a non-limiting example, dropping mechanism may include releasable fasteners, locking pins, shear bolts, latches, actuators, or other controlled-release devices designed to withstand operational loads during normal flight while enabling rapid and reliable separation of engine 136 when initiated. In some embodiments, dropping mechanism may incorporate alignment or guidance features to ensure engine 136 follows a predetermined descent path, avoiding structural interference with aircraft 100.

With continued reference to FIG. 1, in some embodiments, dropping mechanism may include a hoisting component that is attached to the at least an engine. For the purposes of this disclosure, a "hoisting component" is a component configured to facilitate a controlled deployment of at least an engine relative to an engine support structure. As a non-limiting example, hoisting component may include brackets, lifting lugs, slings, cables, pulleys, winches, or integrated lifting interfaces. In a non-limiting example, during installation of engine 136, hoisting component may enable precise alignment of engine 136 with engine support structure 140 by guiding engine 136 into position as it is lifted or lowered.

With continued reference to FIG. 1, in some embodiments, dropping mechanism may include a plurality of releasable fasteners configured to secure at least an engine 136 to engine support structure 140. For the purposes of this disclosure, a "releasable fastener" is a component or device configured to temporarily secure at least an engine to an engine support structure and to release the at least an engine in response to a deployment signal or deployment condition. As a non-limiting example, releasable fasteners may include shear bolts, quick-release pins, latch assemblies, explosive bolts, frangible fittings, or other devices. As another non-limiting example, releasable fasteners may include any devices capable of supporting static and dynamic loads imposed during flight while enabling selective disengagement when required. In some embodiments, releasable fasteners may be arranged at multiple attachment points distributed around engine 136, and each releasable fastener may be individually or collectively actuated by mechanical, hydraulic, pneumatic, or electrical control systems (e.g., actuators). In some embodiments, releasable fastener may be configured to permit reattachment of at least an engine 136 to engine support structure 140 following maintenance, inspection, or servicing procedures. In a non-limiting example, upon completion of maintenance, engine 136 may be repositioned relative to engine support structure 140, and releasable fasteners may be actuated to re-engage corresponding mounting mechanisms or latching mechanisms, thereby restoring structural and mechanical continuity between the engine 136 and the at least an engine support structure 140.

With continued reference to FIG. 1, in some embodiments, dropping mechanism may include an actuator. For the purposes of this disclosure, an "actuator" is a component of a machine that is responsible for moving and/or controlling a mechanism or system. In some embodiments, actuator may, in some cases, require a control signal and/or a source of energy or power. In some cases, a control signal may be relatively low energy. Exemplary control signal forms include electric potential or current, pneumatic pressure or flow, or hydraulic fluid pressure or flow, mechanical force/torque or velocity, or even human power. In some cases, actuator may have an energy or power source other than control signal. This may include a main energy source, which may include for example electric power, hydraulic power, pneumatic power, mechanical power, and the like. In some cases, upon receiving a control signal, actuator may respond by converting source power into mechanical motion. In some cases, the actuator may be understood as a form of automation or automatic control. In some embodiments, actuator of dropping mechanism may include hoisting component, realizable fastener, and the like. In some embodiments, actuator of dropping mechanism may be mechanically connected to sides of nacelle, engine 136, landing gear system 132, and/or the like. In some embodiments, actuator of dropping mechanism may be communicatively connected to a computing system described with respect to FIG. 7. In a non-limiting example, actuator of dropping mechanism may be controlled in response to a pilot command or pilot's maneuver of pilot controls. In some embodiments, computing system may include a flight controller.

With continued reference to FIG. 1, in some embodiments, an actuator of dropping mechanism may include a hydraulic actuator. The hydraulic actuator may consist of a cylinder or fluid motor that uses hydraulic power to facilitate mechanical operation. Output of the hydraulic actuator may include mechanical motion, such as without limitation linear, rotary, or oscillatory motion. In some cases, the hydraulic actuator may employ a liquid hydraulic fluid. As liquids, in some cases. are incompressible, a hydraulic actuator can exert large forces. Additionally, as force is equal to pressure multiplied by area, the hydraulic actuators may act as force transformers with changes in area (e.g., cross sectional area of cylinder and/or piston). An exemplary hydraulic cylinder may consist of a hollow cylindrical tube within which a piston can slide. In some cases, the hydraulic cylinder may be considered single acting. The single acting may be used when fluid pressure is applied substantially to just one side of a piston. Consequently, a single acting piston can move in only one direction. In some cases, a spring may be used to give a single acting piston a return stroke. In some cases, a hydraulic cylinder may be double acting. The double acting may be used when pressure is applied substantially on each side of a piston; any difference in resultant force between the two sides of the piston causes the piston to move.

With continued reference to FIG. 1, in some embodiments, an actuator of dropping mechanism may include a pneumatic actuator. In some cases, the pneumatic actuator may enable considerable forces to be produced from relatively small changes in gas pressure. In some cases, the pneumatic actuator may respond more quickly than other types of actuators, for example hydraulic actuators. The pneumatic actuator may use compressible fluid (e.g., air). In some cases, the pneumatic actuator may operate on compressed air. Operation of hydraulic and/or pneumatic actuators may include control of one or more valves, circuits, fluid pumps, and/or fluid manifolds.

With continued reference to FIG. 1, an actuator may be an electric actuator of dropping mechanism. In some embodiments, the electric actuator may include any electromechanical actuators, linear motors, and the like. In some cases, the actuator may include an electromechanical actuator. The electromechanical actuator may convert a rotational force of an electric rotary motor into a linear movement to generate a linear movement through a mechanism. Exemplary mechanisms, include rotational to translational motion transformers, such as without limitation a belt, a screw, a crank, a cam, a linkage, a scotch yoke, and the like. In some cases, control of an electromechanical actuator may include control of electric motor, for instance a control signal may control one or more electric motor parameters to control electromechanical actuator. Exemplary non-limitation electric motor parameters include rotational position, input torque, velocity, current, and potential. The electric actuator may include a linear motor. The linear motors may differ from electromechanical actuators, as power from linear motors is output directly as translational motion, rather than output as rotational motion and converted to translational motion. In some cases, the linear motor may cause lower friction losses than other devices. The linear motors may be further specified into at least 3 different categories, including flat linear motor, U-channel linear motors and tubular linear motors. The linear motors may be directly controlled by a control signal for controlling one or more linear motor parameters. Exemplary linear motor parameters include without limitation position, force, velocity, potential, and current.

With continued reference to FIG. 1, in some embodiments, an actuator of dropping mechanism may include a mechanical actuator. In some cases, the mechanical actuator may function to execute movement by converting one kind of motion, such as rotary motion, into another kind, such as linear motion. An exemplary mechanical actuator may include a rack and pinion. In some cases, a mechanical power source, such as a power take off may serve as power source for the mechanical actuator. The mechanical actuators may employ any number of mechanisms, including for example without limitation gears, rails, pulleys, cables, linkages, and the like.

With continued reference to FIG. 1, in some embodiments, a plurality of releasable fasteners may be configured to release in response to a deployment signal when at least a landing gear system 132 is extended. For the purposes of this disclosure, a "deployment signal" is a control signal to indicate that a predetermined condition for engine release has been satisfied. In some embodiments, deployment signal may be generated based on input from sensors monitoring a position or extension state of landing gear system 132. In some embodiments, deployment signal may be generated based on parameters such as air speed, altitude, aircraft attitude, or the like. In some embodiments, deployment signal may be transmitted electrically, optically, or wirelessly to releasable fasteners or to a central dropping mechanism controller, initiating a release sequence of engine 136. In some embodiments, deployment signal may be combined with safety interlocks, requiring confirmation from a flight crew, automatic system logic, or ground-based control systems before engine release is authorized. In some embodiments, dropping mechanism may be operatively coupled to aircraft systems. As a non-limiting example, dropping mechanism may be operatively coupled to landing gear sensors, manual override controls, or automated safety systems, to ensure engine release occurs only under predetermined condition. For example, and without limitation, the predetermined condition may include an extension of landing gear system 132, aircraft orientation, proximity to a designated emergency landing site, or the like.

With continued reference to FIG. 1, in some embodiments, deployment signal may include an indication of whether aircraft 100 is currently on ground and/or whether at least a portion of landing gear system 132 is occupying gear well or well 120. In some embodiments, deployment signal may be generated based on sensor data received from one or more flight status sensors, altimeters, airspeed indicators, or attitude determination systems configured to detect whether the aircraft is airborne. Additionally, in some embodiments, deployment signal may include positional data from landing gear sensors, proximity detectors, or mechanical limit switches configured to determine whether landing gear system 132 is at least partially occupying gear well or well 120. In some embodiments, processor or control system may conditionally enable or inhibit activation of dropping mechanism as a function of the deployment signal, thereby preventing unintentional engine displacement during flight, or when the gear well or well 120 is obstructed by a presence of landing gear system 132. In some embodiments, deployment signal may be transmitted to or processed by a logic controller that verifies aircraft 100 is on the ground and gear well or well 120 is unobstructed before authorizing engine release. In some embodiments, a plurality of releasable fasteners may be configured to release in response to a deployment signal when at least a landing gear system 132 is fully extended (e.g., landing gear system 132 in a hiked configuration).

With continued reference to FIG. 1, in some embodiments, deployment signal may be generated only when aircraft 100 is currently situated on a ground surface (e.g., a landing strip, prior to takeoff, following landing and/or the like) and well 120 is unoccupied. In a non-limiting example, the on-ground condition (wherein the on ground condition includes an instance in which aircraft is contact with a ground surface) may be determined by one or more ground contact sensors, such as weight-on-wheels (WoW) switches or proximity-based systems configured to detect when aircraft 100 is in contact with a landing surface. In a non-limiting example, the unoccupied state of well 120 may be verified through gear position sensors, proximity sensors, or other detection systems configured to determine whether any portion of a landing gear system 132 or other structure is present within the well 120. By requiring both that aircraft 100 be on the ground and that well 120 be clear of obstructions, this embodiment ensures that the deployment signal can be only generated under safe and controlled conditions. This configuration mitigates the risk of unintended engine release during flight or during phases of ground operation in which the well 120 may be not available for safe displacement of the engine 136.

With continued reference to FIG. 1, in some embodiments, deployment signal may be generated only upon a receipt of a pilot-initiated input configured to activate a dropping mechanism. For the purposes of this disclosure, a "pilot-initiated input" is a command generated by a pilot or flight crew through an interface element configured to activate or authorize any functions or mechanisms of an aircraft. In some embodiments, pilot-initiated input may be provided from one or more cockpit controls, such as a physical switch, button, touchscreen interface, or software-based control integrated into an aircraft's flight management system. In some embodiments, pilot-initiated input may be routed through an interlock system requiring confirmation of aircraft status conditions, such as an aircraft 100 being on the ground and well 120 being unoccupied, prior to enabling the generation or activation of a deployment signal. In a non-limiting example, pilot-initiated input may be used to ensure that activation of a dropping mechanism occurs only under direct and deliberate control, thereby serving as an additional safeguard against accidental or inappropriate engine release.

With continued reference to FIG. 1, for the purposes of this disclosure, a "sensor" is a device that produces an output signal for the purpose of sensing a physical phenomenon. For example, and without limitation, the at least a sensor may transduce a detected phenomenon, such as without limitation, temperature, voltage, current, pressure, speed, motion, light, moisture, and the like, into a sensed signal. The at least a sensor may output the sensed signal. The at least a sensor may include any computing device as described in the entirety of this disclosure and configured to convert and/or translate a plurality of signals detected into electrical signals for further analysis and/or manipulation. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sine function, or pulse width modulated signal. Any datum captured by the at least a sensor may include circuitry, computing devices, electronic components or a combination thereof that translates into at least an electronic signal configured to be transmitted to another electronic component. In one or more embodiments, and without limitation, the at least a sensor may include a plurality of sensors. In some embodiments, sensor may be configured to detect movement, position or extension of landing gear system 132. In some embodiments, sensor may be configured to detect movement, position or extension of sides of nacelle. In some embodiments, sensor may include feedback sensors, such as load cells, position sensors, or strain gauges, to monitor an engine's alignment and weight distribution throughout a hoisting or release process.

With continued reference to FIG. 1, in some embodiments, at least a sensor may include a pressure sensor. Pressure, for the purposes of this disclosure, and as would be appreciated by someone of ordinary skill in the art, is a measure of force required to stop a fluid from expanding and is usually stated in terms of force per unit area. The pressure sensor that may be included in at least a sensor may be configured to measure an atmospheric pressure and/or a change of atmospheric pressure. In some embodiments, the pressure sensor may include an absolute pressure sensor, a gauge pressure sensor, a vacuum pressure sensor, a differential pressure sensor, a sealed pressure sensor, and/or other unknown pressure sensors or alone or in a combination thereof. The pressor sensor may include a barometer. In some embodiments, the pressure sensor may be used to indirectly measure fluid flow, speed, water level, and altitude. In some embodiments, the pressure sensor may be configured to transform a pressure into an analogue electrical signal. In some embodiments, the pressure sensor may be configured to transform a pressure into a digital signal.

With continued reference to FIG. 1, in some embodiments, at least a sensor may include an airspeed sensor. For the purposes of this disclosure, an "airspeed sensor" is instrument that measures the speed of an aircraft relative to the surrounding air. In some embodiments, airspeed sensor may be configured to detect and transduce airspeed of an aircraft into airspeed datum. In some embodiments, airspeed sensor may be configured to transmit the airspeed datum to a flight controller. The airspeed sensor may be analog or digital sensor. The airspeed sensor may measure the speed of an aircraft using the differential between the pressure of still air (static pressure) and that of moving air compressed by the forward motion of the electric aircraft (ram pressure).

With continued reference to FIG. 1, in some embodiments, dropping mechanism may be configured to open at least one side of a nacelle, wherein the nacelle may be configured to house at least an engine 136. For the purposes of this disclosure, a "nacelle" is a streamlined body housing, which is sized according to that which it houses, such as without limitation an engine, a fuel store, or a flight component. When attached by a pylon entirely outside an airframe a nacelle may sometimes be referred to as a pod, in which case an engine 136 within the nacelle may be referred to as a podded engine. In some cases, an aircraft cockpit may also be housed in a nacelle, rather than in a conventional fuselage. At least a nacelle may substantially encapsulate a propulsor, which may include a motor or an engine 136.

Figure 4A:
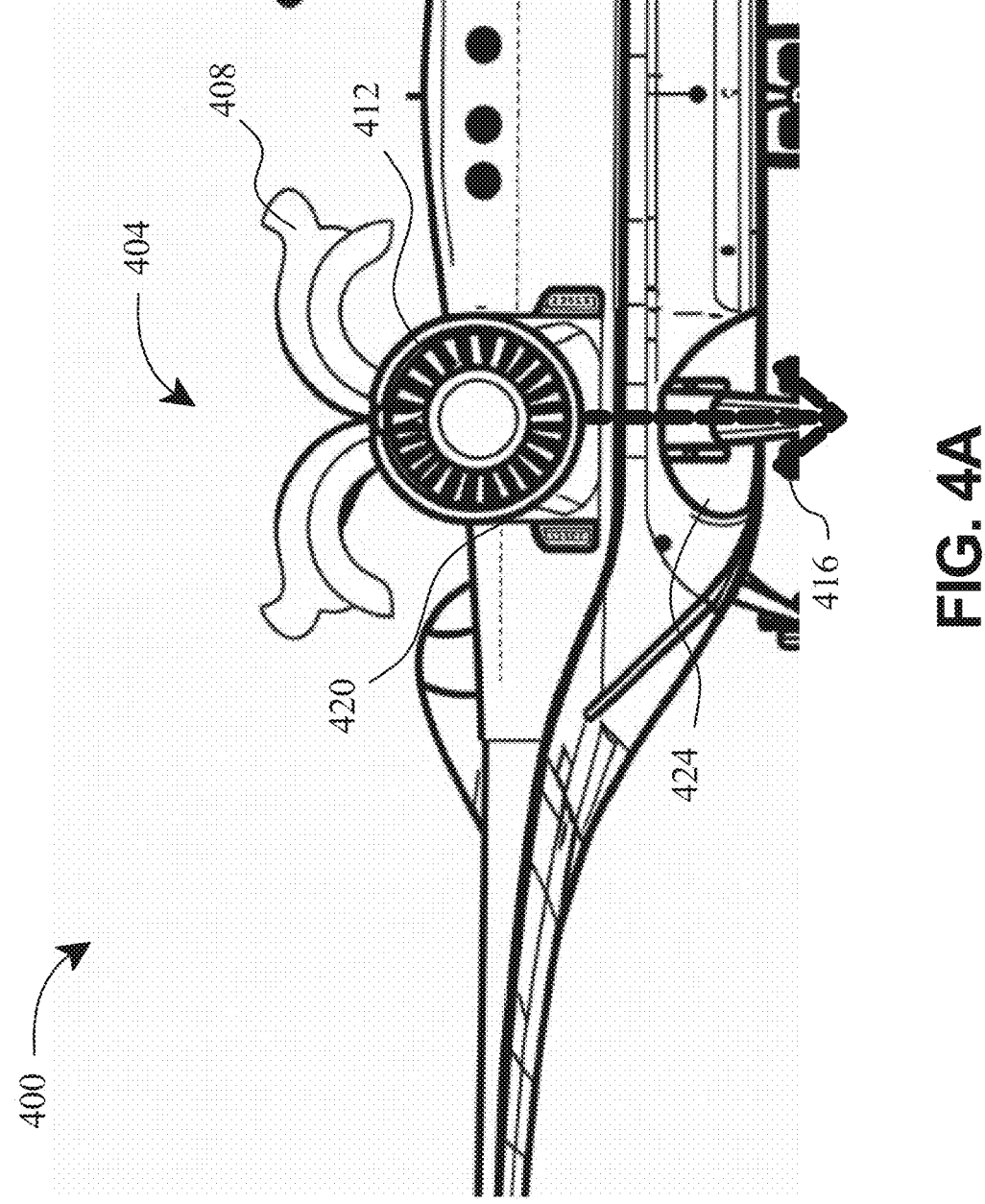
FIG. 4A illustrates a portion of an aircraft with a nacelle with its sides opened.

In some embodiments, nacelle may serve as an aerodynamic enclosure that surrounds and protects the engine 136 during normal flight operations. In some embodiments, nacelle may be contoured to minimize aerodynamic drag while accommodating external dimensions and operational requirements of the 136. In some embodiments, nacelle may include forward intake openings for directing airflow into engine 136. In some embodiments, nacelle may include exhaust openings for expelling engine exhaust gases. In some embodiments, nacelle may include at least one side panel, door, or hinged section that is operably coupled to dropping mechanism. In a non-limiting example, when dropping mechanism is activated, at least one side of nacelle may be moved from a closed position, in which it forms a continuous aerodynamic surface with the remainder of the nacelle, to an open position that creates a clearance path through which the engine 136 can be released from aircraft 100. In some embodiments, dropping mechanism may include mechanical linkages, hydraulic or pneumatic actuators, or electromechanical devices to open at least one side of nacelle. In some embodiments, dropping mechanism may be triggered to open sides of nacelle in response to data detected by sensor or pilot's control. In some embodiments, nacelle side panel or sides of nacelle may rotate outward or downward, forming a chute or guide surface to further control the descent path of engine 136. In some embodiments, nacelle may include segmented panels that fold, slide, or retract into aircraft structure to create a larger aperture. In some embodiments, an opening of at least one nacelle side panel may be automatically sequenced with an extension of landing gear system 132 or generation of a deployment signal, ensuring that the nacelle opens only when the conditions for safe engine release have been satisfied. In some embodiments, nacelle side panel may be equipped with sensors to confirm its position, thereby preventing premature or incomplete release if the panel fails to fully open. Sides of a nacelle that is opened using a dropping mechanism is illustrated in FIG. 4A.

Figure 2:
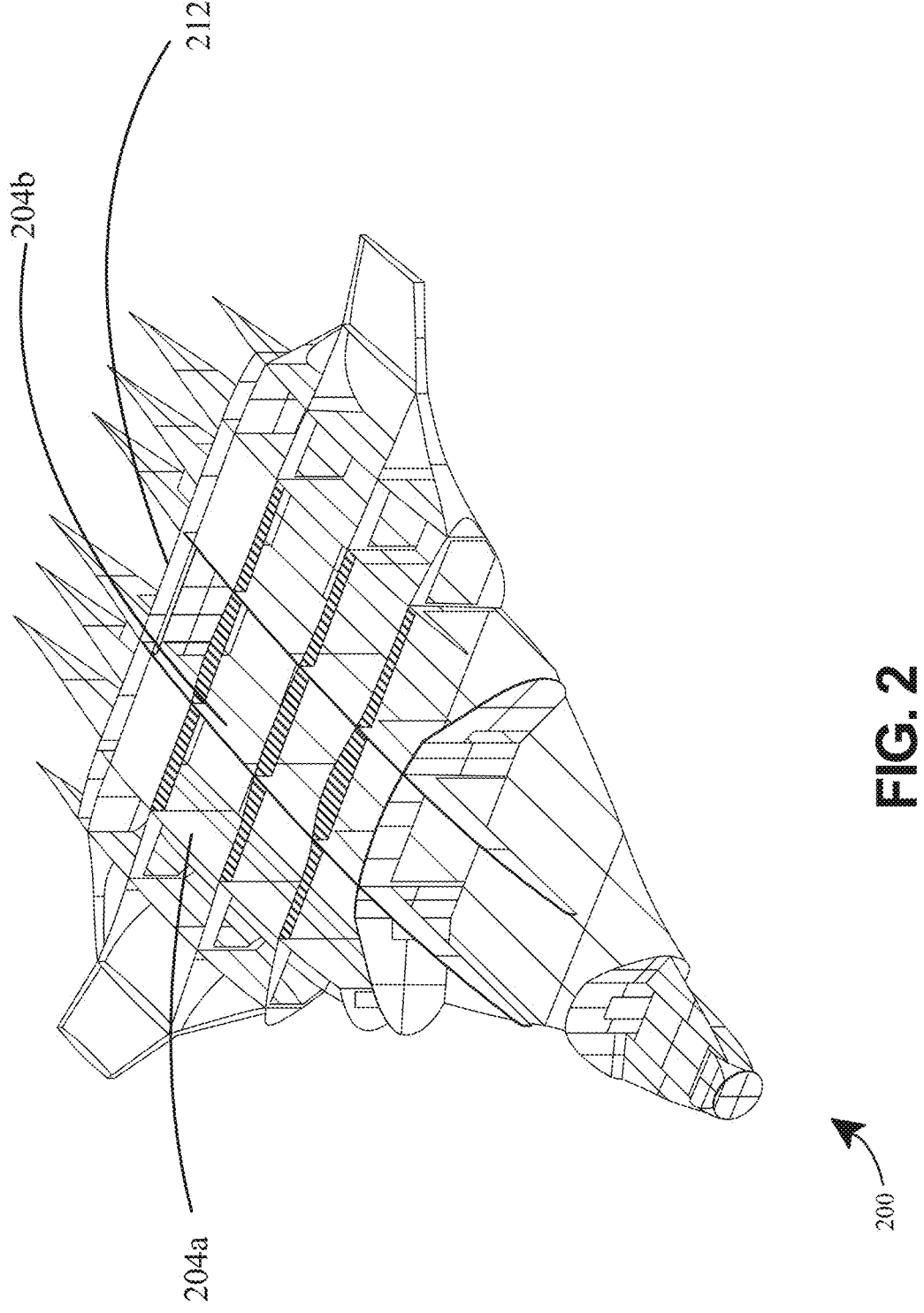
FIG. 2 illustrates exemplary embodiments of structural components of an aircraft.

Now referring to FIG. 2, an exemplary embodiment of an aircraft structure 200 is described. In one or more embodiments, aircraft structure 200 may be consistent with any aircraft as described in this disclosure. In one or more embodiments, aircraft structure 200 may include a structure of a fuselage of aircraft 100 wherein the fuselage may include the main body 104 and rear spar 108/212. In one or more embodiments, fuselage may include a plurality of ribs 204a-b. As used herein, a "rib" is a structural member that runs longitudinally down a fuselage. In some embodiments, a rib may be the forming element of the structure of a wing. Ribs of aircraft may include form-ribs, plate type ribs, closed-ribs, forged ribs, milled ribs, and the like. Ribs may be made of made out of wood, metal, plastic, composites, foam, and the like. A plurality of ribs may include a first rib 204*a* and a second rib 204*b*. Additionally, fuselage may include one or more spars. A "spar," as used herein, is structural member of an aircraft that is transverse to longitudinal structural members. Spars may carry flight loads and the weight of the wings while on the ground. Spars may be made of metal, wood, composite materials, and the like. Spars may run perpendicular to the ribs. First rib 204*a* and second rib 204*b* may be attached to a rear-most spar of the one or more spars.

Still referring to FIG. 2, in some embodiments, engine may be mounted behind a pressure vessel of main body or on an aft portion of fuselage. As used herein, a "pressure vessel" is a closed container, compartment, storage, or vessel that is designed to withstand pressures higher or lower than the surrounding atmosphere. For example, at higher altitudes an interior of the main body of aircraft 100 may contain a large pressure difference in comparison to the atmospheric pressure such that the main body of aircraft 100 is a pressure vessel. In some embodiments, engines may be mounted to ribs of the aircraft attached to aft face of aft pressure bulkhead or rear spar 212; the opened ended structure may allow easer mounting of an engine. As used herein, "rear pressure bulkhead" and "aft pressure bulkhead" are used interchangeably to mean a rear pressure containing component of an airframe. In some embodiments, a rear pressure bulkhead may include the rearmost pressure sealing element of a pressure vessel. In some embodiments, rear pressure bulkhead may include a rear-most rib. In some embodiments, rear pressure bulkhead may include a rear-most frame. In some embodiments, the two outer most (laterally) spars may include pressure bulkheads configured to resist a pressure loading resulting from low ambient pressure and the like. In some embodiments, pressure vessel may include a passenger compartment. In one or more embodiments, aft pressure bulkhead may include a rear spar 212 as described above.

Figure 3:
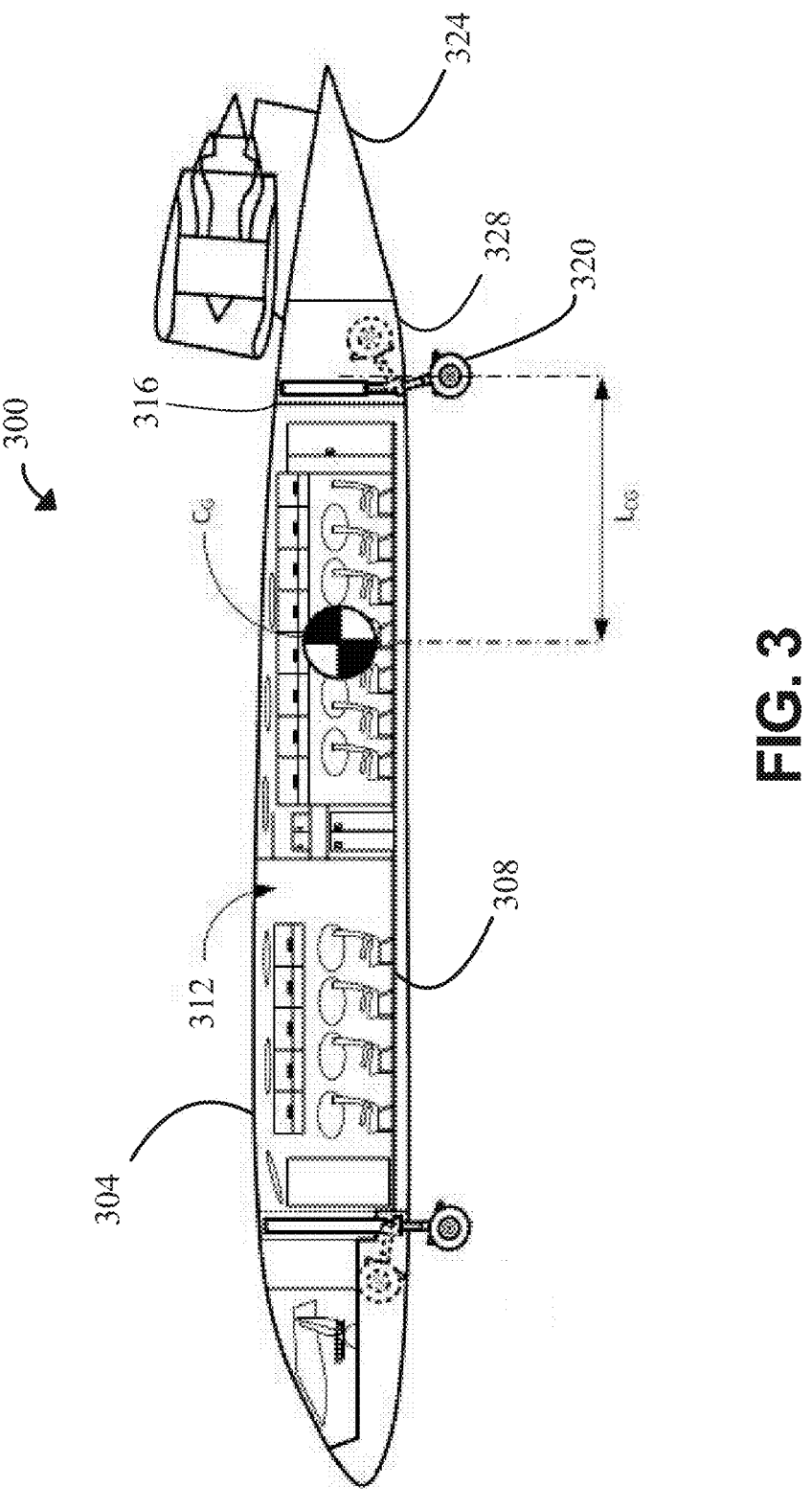
FIG. 3 is a side view illustration of an exemplary aircraft.

Referring now to FIG. 3, an exemplary aircraft 300 is illustrated in side-view. Aircraft 300 may include a blended wing body 304. Aircraft 300 may include a single deck 308. In some embodiments, blended wing body 304 and or fuselage, as described above, may include single deck 308. Single deck 308 may include a passenger compartment 312. In one or more embodiments, aircraft 300 may include a single deck wherein passengers and/or cargo are located on or above the single deck.

With continued reference to FIG. 3, as used in this disclosure, a "deck" on an aircraft is platform upon which one or more of passengers and cargo may be stored. A single deck 308 may be contrasted with a two-deck configuration analogously to a single-story house contrasted to a two-story house. In some cases, a single deck may have deviations in angle or height, just as a single-story house may have rooms in which one steps-up or steps-down in when entering. For example, in some cases, a single deck 308 may include multiple bays (e.g., 2 bays, 3 bays, 4 bays, 5 bays, and the like). Each of the multiple bays may have a floor which is not in plane with another bay. Furthermore, in some cases, a single deck 308 may not be entirely of a single plane or angle. For example, single deck 308 may have slight grade introduced in one or more portions. Slight grade in single deck 308 may match or parallel an outer mold line of aircraft. While a single deck 308 need not be comprised of a single plane, a single deck 308 may be characterized by its not having another deck directly above or below it. A plane coincident with single deck 308 may be conceptualized as a horizontal line, coincident with the single deck 308, extending across FIG. 3.

With continued reference to FIG. 3, a rear spar 316 may be located aft of the passenger compartment. In one or more embodiments, rear spar 316 may be located on or more above single deck 308. In one or more embodiments, a landing gear 320 may be extended outside of rear spar 316 during takeoff and landing. In one or more embodiments, landing gear 320 may be stowed within a boundary created by rear spar 316 during flight. In one or more embodiments, landing gear 320 may be stowed and/or retracted within a convergent aft center body 324 wherein landing gear 320 may be situated within a boundary created by an outer mold line of aircraft 300. In one or more embodiments, rear spar 316 may separate a passenger compartment of main body with convergent aft center body 324. In one or more embodiments, convergent aft center body may extend from rear spar to an aft of aircraft 300. In one or more embodiments, convergent aft center body may include a gear well 328. In one or more embodiments, gear well 328 may be located aft of rear spar. In one or more embodiments, gear well 328 may be situated near rear spar wherein rear spar may provide structure to gear well 328. In one or more embodiments, landing gear 320 may be stowed within gear well 328 during a flight. In one or more embodiments, landing gear and gear well may be situated aft or rear spar 316. In one or more embodiments, rear spar may separate the pressurized passenger cabin from an unpressurized convergent aft center body. In one or more embodiments, landing gear 320 and a propulsor may be located aft of rear spar 316 in order to protect passenger cabin from any malfunctions occurred by landing gear or the propulsor. In one or more embodiments, landing gear and/or propulsor may be located aft of rear spar 316 wherein malfunctioning of landing gear 320 and/or propulsor may allow for the pressure vessel to remain intact.

Referring now to FIG. 4A, an illustration of a portion of an aircraft 400 with a nacelle 404 with its sides 408 opened is illustrated. In some embodiments, nacelle side panel or sides 408 of nacelle 404 may rotate outward or downward as illustrated in FIG. 4A, forming a chute or guide surface to further control the descent path of engine 412. In some embodiments, nacelle 404 may include segmented panels that fold, slide, or retract into aircraft structure to create a larger aperture. In some embodiments, an opening of at least one side 408 of nacelle 404 may be automatically sequenced with an extension of landing gear system 416 or generation of a deployment signal, ensuring that the nacelle 404 opens only when the conditions for safe engine release have been satisfied. In some embodiments, sides 408 of nacelle 404 may be equipped with sensors to confirm its position, thereby preventing premature or incomplete release if the panel fails to fully open. In some embodiments, sides 408 of nacelle 404 may house engine support structure 420. In a non-limiting example, as sides 408 of nacelle 404 opens, engine support structure 420 may be exposed. In a non-limiting example, when sides 408 of nacelle 404 open, exposure of engine support structure 420 may allow hoisting component, latching mechanism, releasable fasteners or actuators of dropping mechanism to drop engine 412 through aircraft 400. In some embodiments, aircraft 400 may include a well 424. In some embodiments, well 424 may include a gear well. In FIG. 4A, an arrow illustrates a path along which engine 412 is vertically dropped from well 424.

Figure 4B:
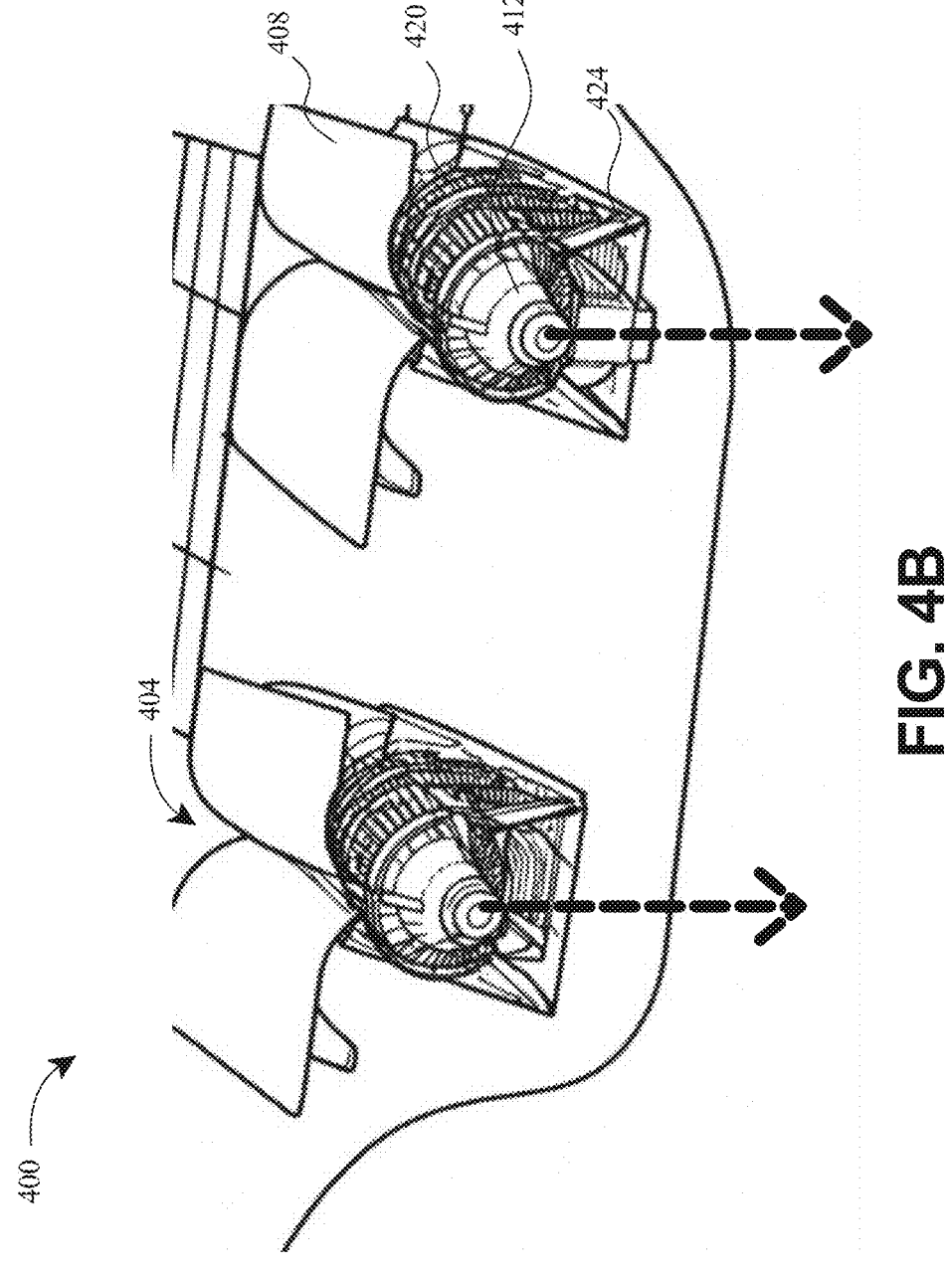
FIG. 4B illustrates a portion of an aircraft with two engines.

Referring now to FIG. 4B, a portion of an aircraft 400 with two engines 412 is illustrated. Well 424 extends from an upper surface of aircraft 400 toward a lower surface of the aircraft 400. In some embodiments, well 424 may include a gear well configured to accommodate components of a landing gear system 416 when retracted. Engine 412 may be supported by an engine support structure 420, which is positioned above well 424 and within nacelle 404. As illustrated in FIG. 4B, directional arrows indicate a vertical drop path along which engine 412 may be displaced downward from its mounted position, passing through well 424. This configuration enables engine 412 to be vertically released through the aircraft structure without interference, allowing for removal, replacement, or emergency jettisoning. Engines 412 can be vertically displaced to engine support structure 420 through well 424. The alignment of engine 412 directly above well 424 facilitates this controlled vertical displacement, which may be actuated by a dropping mechanism as described elsewhere in the present disclosure.

Figures 5A, 5B, 5C:
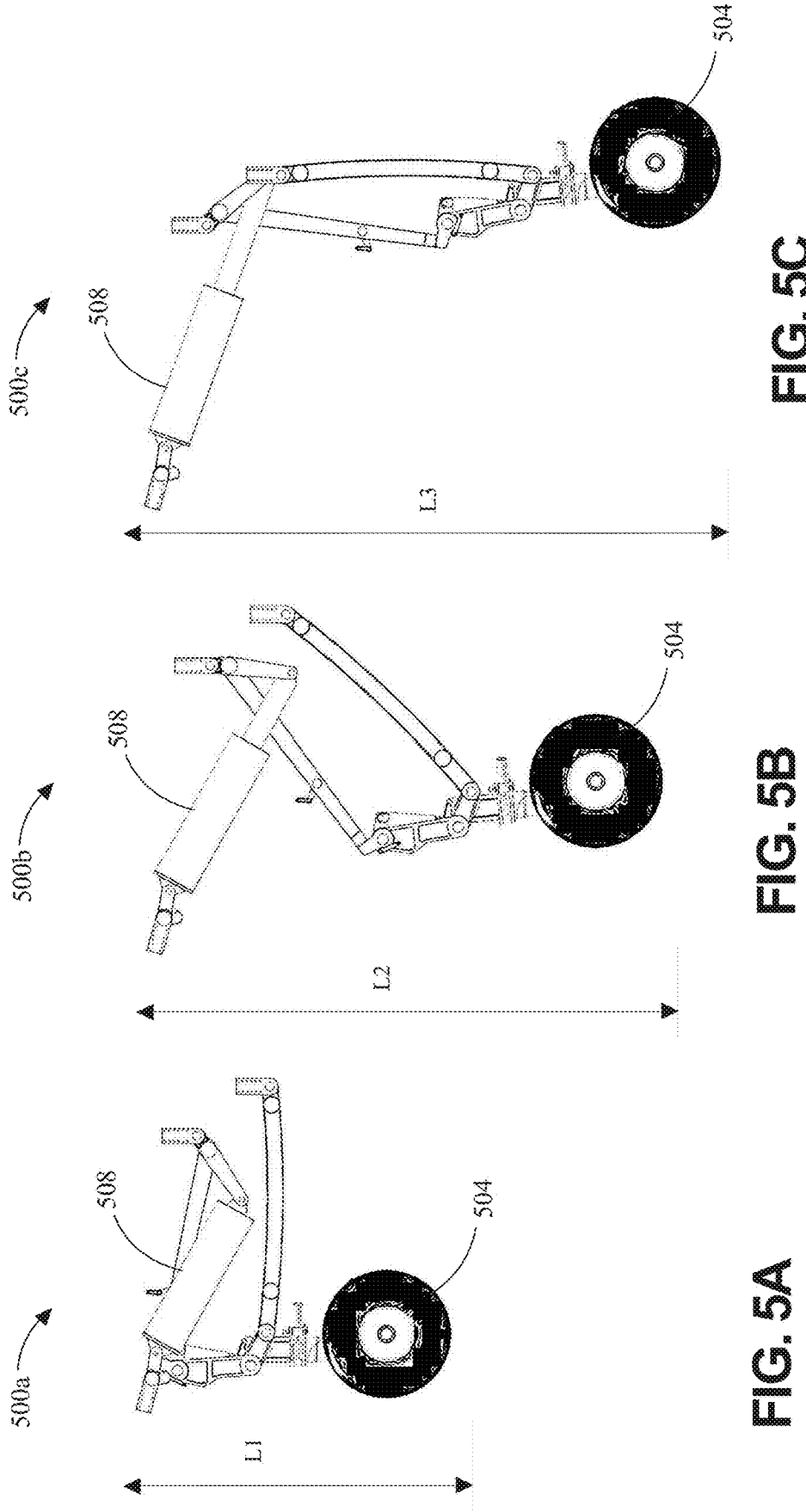
FIGS. 5A-C illustrate exemplary landing gear systems with a different extension level.

Referring now to FIG. 5A, an exemplary embodiment of a landing gear system 500a in a knelt configuration is described. In one or more embodiments, in a knelt configuration landing gear system may contain a first landing gear length L1, wherein the length may denote a distance from a landing gear wheel 504 until an upper most component on landing gear system. In one or more embodiments, in a first position, one or more single stage actuators 508 are in a knelt configuration wherein the knelt configuration includes the single stage actuators 508 being in a retracted state. In one or more embodiments, in a knelt configuration an aircraft containing landing gear system 500a may be parallel with a ground surface wherein first landing gear length L1 may be substantially similar to a landing gear length of a main gear of the aircraft.

Referring now to FIG. 5B, an exemplary embodiment of a landing gear system 500b in a mid-hiked configuration is described. In one or more embodiments, in a mid-hiked configuration, single stage actuator 508 may be partially extended, wherein single stage actuator 508 may be between a retracted and extended state. In one or more embodiments, in a mid-hiked configuration, single stage actuator 508 may be hydraulically locked wherein single stage actuator 508 may not extend or retract. In one or more embodiments, hydraulically locking single stage actuator 508 may allow for a landing gear system to contain a fixed length during use. In one or more embodiments, in a second position, the one or more single stage actuators 508 may be in a mid-hiked configuration such that landing gear system contains a second landing gear length L2. In one or more embodiments, second landing gear length L2 may be larger in measurement than first landing gear length L1. In one or more embodiments, second landing gear length may denote a distance from a landing gear wheel 504 until an upper most component on landing gear system. In one or more embodiments, extension of single stage actuator 508 may result in an increase in a length of the landing gear such that the length of the landing gear may increase from first landing gear length L1 to second landing gear length L2. In one or more embodiments, landing gear may extend linearly wherein landing gear wheel 504 may extend in a linear downward motion relative to an aircraft. In one or more embodiments, in a mid-hiked configuration, landing gear system 500b may provide for a positive aircraft rotation angle about a pitch axis. In one or more embodiments, a positive aircraft rotation angle about a pitch axis may cause a distance from the nose of the aircraft to a ground surface to increase. In one or more embodiments, aircraft rotation angle may vary between 0 and 5 degrees in a mid-hiked configuration. In one or more embodiments, landing gear system 500b may provide for an aircraft rotation angle of between 5 and 5 degrees. In one or more embodiments, landing gear system 500b. may provide for an aircraft rotation angle of at least 4 degrees.

Referring now to FIG. 5C, an exemplary embodiment of a landing gear system 500c in a hiked configuration is described. In one or more embodiments, in a hiked configuration, single stage actuator 508 may be completely extended. In one or more embodiments, extension of single stage actuator 508 may cause a length of landing gear system to increase. In one or more embodiments, in a third position, the one or more single stage actuators 508 are in a hiked configuration and the landing gear system includes a third landing gear length L3. In one or more embodiments, single stage actuator 508 may be in a hiked configuration in instances in which single stage actuator 508 is fully extended to its maximum capable distance. In one or more embodiments, third landing gear length may be measured similar to second landing gear length L2 and first landing gear length L2. In one or more embodiments, third landing gear Length L3 may be larger in measurement than that of second landing gear length L2. In one or more embodiments, third landing gear length may cause an aircraft rotation angle of at least 5 degrees. In one or more embodiments, third landing gear length may cause an aircraft rotation angle of 5, 6, 7, and/or 8 degrees. In one or more embodiments, landing gear wheel 504 may extend linearly from a knelt position to a mid-hiked position and from a mid-hiked position to a hiked position. In one or more embodiments, landing gear wheel 504 may extend in a predominantly linear motion wherein landing gear wheel 504 may slightly rotate to allow for proper extension of landing gear system 500a.

Figure 6:
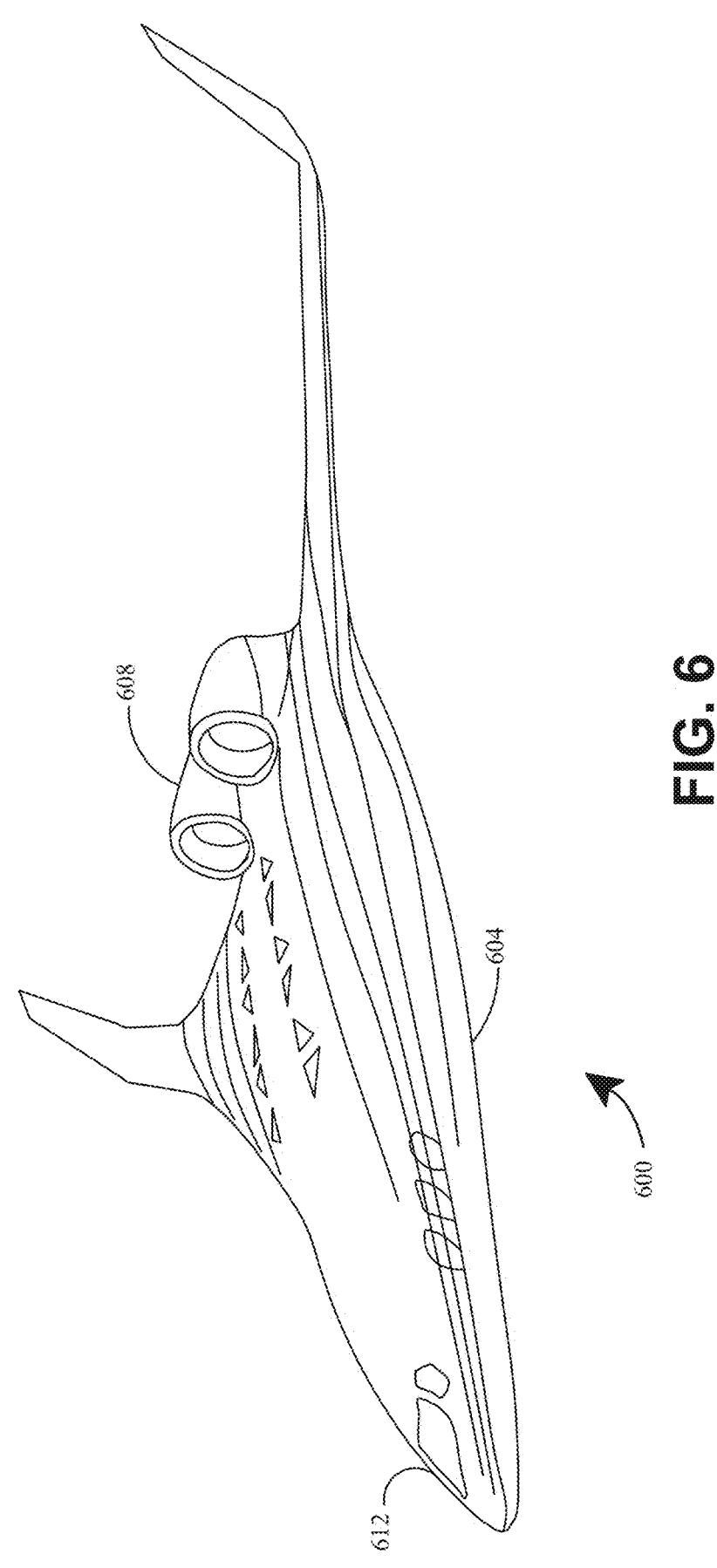
FIG. 6 illustrates a schematic of an exemplary blended wing body aircraft.

Referring to FIG. 6, an exemplary blended wing aircraft 600 is illustrated. Aircraft 600 may include a blended wing body 604. For the purposes of this disclosure, a "blended wing body aircraft" is an aircraft having a blended wing body. As used in this disclosure, A "blended wing body" (BWB), also known as a "blended body" or a "hybrid wing body" (HWB), is a fixed-wing aircraft body having no clear or abrupt demarcation between wings and a main body of the aircraft along a leading edge of the aircraft. For example, a BWB 604 aircraft may have distinct wing and body structures, which are smoothly blended together with no clear dividing line or boundary feature between wing and fuselage. This contrasts with a flying wing, which has no distinct fuselage, and a lifting body, which has no distinct wings. In some embodiments, a BWB 604 may have no clear or abrupt demarcation between wings and a main body of the aircraft along a trailing edge of the aircraft. A BWB 604 design may or may not be tailless. One potential advantage of a BWB 604 may be to reduce wetted area and any accompanying drag associated with a conventional wing-body junction. In some cases, a BWB 604 may also have a wide airfoil-shaped body, allowing entire aircraft to generate lift and thereby facilitate reduction in size and/or drag of wings. In some cases, a BWB 604 may be understood as a hybrid shape that resembles a flying wing, but also incorporates features from conventional aircraft. In some cases, this combination may offer several advantages over conventional tube-and-wing airframes. In some cases, a BWB airframe may help to increase fuel economy and create larger payload (cargo or passenger) volumes within the BWB. BWB 604 may allow for advantageous interior designs. For instance, cargo can be loaded and/or passengers can board from the front or rear of the aircraft. A cargo or passenger area may be distributed across a relatively wide (when compared to conventional tube-wing aircraft) fuselage, providing a large usable volume. In some embodiments, passengers seated within an interior of aircraft, real-time video at every seat can take place of window seats.

With continued reference to FIG. 6, BWB 604 of aircraft 600 may include a nose portion. A "nose portion," for the purposes of this disclosure, refers to any portion of aircraft 600 forward of the aircraft's fuselage 612. Nose portion may comprise a cockpit (for manned aircraft), canopy, aerodynamic fairings, windshield, and/or any structural elements required to support mechanical loads. Nose portion may also include pilot seats, control interfaces, gages, displays, inceptor sticks, throttle controls, collective pitch controls, and/or communication equipment, to name a few. Nose portion may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion may be configured to open in a plurality of orientations and directions.

With continued reference to FIG. 6, BWB 604 may include at least a structural component of aircraft 600. Structural components may provide physical stability during an entirety of an aircraft's 100 flight envelope, while on ground, and during normal operation Structural components may comprise struts, beams, formers, stringers, longerons, interstitials, ribs, structural skin, doublers, straps, spars, or panels, to name a few. Structural components may also comprise pillars. In some cases, for the purpose of aircraft cockpits comprising windows/windshields, pillars may include vertical or near vertical supports around a window configured to provide extra stability around weak points in a vehicle's structure, such as an opening where a window is installed. Where multiple pillars are disposed in an aircraft's 100 structure, they may be so named A, B, C, and so on named from nose to tail. Pillars, like any structural element, may be disposed a distance away from each other, along an exterior of aircraft 600 and BWB 604. Depending on manufacturing method of BWB 604, pillars may be integral to frame and skin, comprised entirely of internal framing, or alternatively, may be only integral to structural skin elements. Structural skin will be discussed in greater detail below.

With continued reference to FIG. 6, BWB 604 may include a plurality of materials, alone or in combination, in its construction. At least a BWB 604, in an illustrative embodiment may include a welded steel tube frame further configured to form a general shape of a nose corresponding to an arrangement of steel tubes. Steel may include any of a plurality of alloyed metals, including but not limited to, a varying amount of manganese, nickel, copper, molybdenum, silicon, and/or aluminum, to name a few. Welded steel tubes may be covered in any of a plurality of materials suitable for aircraft skin. Some of these may include carbon fiber, fiberglass panels, cloth-like materials, aluminum sheeting, or the like. BWB 604 may comprise aluminum tubing mechanically coupled in various and orientations. Mechanical fastening of aluminum members (whether pure aluminum or alloys) may comprise temporary or permanent mechanical fasteners appreciable by one of ordinary skill in the art including, but not limited to, screws, nuts and bolts, anchors, clips, welding, brazing, crimping, nails, blind rivets, pull-through rivets, pins, dowels, snap-fits, clamps, and the like. BWB 604 may additionally or alternatively use wood or another suitably strong yet light material for an internal structure.

With continued reference to FIG. 6, aircraft 600 may include monocoque or semi-monocoque construction. BWB 604 may include carbon fiber. Carbon fiber may include carbon fiber reinforced polymer, carbon fiber reinforced plastic, or carbon fiber reinforced thermoplastic (e.g., CFRP, CRP, CFRTP, carbon composite, or just carbon, depending on industry). "Carbon fiber," as used in this disclosure, is a composite material including a polymer reinforced with carbon. In general, carbon fiber composites consist of two parts, a matrix and a reinforcement. In carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. A person of ordinary skill in the art will appreciate that the advantages of carbon fibers include high stiffness, high tensile strength, low weight, high chemical resistance, high temperature tolerance, and low thermal expansion. According to embodiments, carbon fibers may be combined with other materials to form a composite, when permeated with plastic resin and baked, carbon fiber reinforced polymer becomes extremely rigid. Rigidity may be considered analogous to stiffness which may be measured using Young's Modulus. Rigidity may be defined as a force necessary to bend and/or flex a material and/or structure to a given degree. For example, ceramics have high rigidity, which can be visualized by shattering before bending. In embodiments, carbon fibers may additionally, or alternatively, be composited with other materials like graphite to form reinforced carbon-carbon composites, which include high heat tolerances over 2000° C. A person of skill in the art will further appreciate that aerospace applications may require high-strength, low-weight, high heat resistance materials in a plurality of roles, such as without limitation fuselages, fairings, control surfaces, and structures, among others.

With continued reference to FIG. 6, BWB 604 may include at least a fuselage. A "fuselage," for the purposes of this disclosure, refers to a main body of an aircraft 600, or in other words, an entirety of the aircraft 600 except for nose, wings, empennage, nacelles, and control surfaces. In some cases, fuselage may contain an aircraft's payload. At least a fuselage may comprise structural components that physically support a shape and structure of an aircraft 600. Structural components may take a plurality of forms, alone or in combination with other types. Structural components vary depending on construction type of aircraft 600 and specifically, fuselage. A fuselage 612 may include a truss structure. A truss structure may be used with a lightweight aircraft. A truss structure may include welded steel tube trusses. A "truss," as used in this disclosure, is an assembly of beams that create a rigid structure, for example without limitation including combinations of triangles to create three-dimensional shapes. A truss structure may include wood construction in place of steel tubes, or a combination thereof. In some embodiments, structural components can comprise steel tubes and/or wood beams. An aircraft skin may be layered over a body shape constructed by trusses. Aircraft skin may comprise a plurality of materials such as plywood sheets, aluminum, fiberglass, and/or carbon fiber.

With continued reference to FIG. 6, in embodiments, at least a fuselage may comprise geodesic construction. Geodesic structural elements may include stringers wound about formers (which may be alternatively called station frames)

in opposing spiral directions. A "stringer," for the purposes of this disclosure is a general structural element that may include a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along a length of an interior of a fuselage orthogonal to a longitudinal (nose to tail) axis of aircraft 600. In some cases, a former forms a general shape of at least a fuselage. A former may include differing cross-sectional shapes at differing locations along a fuselage, as the former is a structural component that informs an overall shape of the fuselage. In embodiments, aircraft skin can be anchored to formers and strings such that an outer mold line of volume encapsulated by the formers and stringers comprises a same shape as aircraft 600 when installed. In other words, former (s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

With continued reference to FIG. 6, according to some embodiments, a fuselage can comprise monocoque construction. Monocoque construction can include a primary structure that forms a shell (or skin in an aircraft's case) and supports physical loads. Monocoque fuselages are fuselages in which the aircraft skin or shell may also include a primary structure. In monocoque construction aircraft skin would support tensile and compressive loads within itself and true monocoque aircraft can be further characterized by an absence of internal structural elements. Aircraft skin in this construction method may be rigid and can sustain its shape with substantially no structural assistance form underlying skeleton-like elements. Monocoque fuselage may include aircraft skin made from plywood layered in varying grain directions, epoxy-impregnated fiberglass, carbon fiber, or any combination thereof.

With continued reference to FIG. 6, according to some embodiments, a fuselage may include a semi-monocoque construction. Semi-monocoque construction, as used in this disclosure, is used interchangeably with partially mono-coque construction, discussed above. In semi-monocoque construction, a fuselage may derive some structural support from stressed aircraft skin and some structural support from underlying frame structure made of structural components. Formers or station frames can be seen running transverse to a long axis of fuselage with circular cutouts which are may be used in real-world manufacturing for weight savings and for routing of electrical harnesses and other modern on-board systems. In a semi-monocoque construction, stringers may be thin, long strips of material that run parallel to a fuselage's long axis. Stringers can be mechanically coupled to formers permanently, such as with rivets. Aircraft skin can be mechanically coupled to stringers and formers permanently, such as by rivets as well. A person of ordinary skill in the art will appreciate that there are numerous methods for mechanical fastening of the aforementioned components like screws, nails, dowels, pins, anchors, adhesives like glue or epoxy, or bolts and nuts, to name a few. According to some embodiments, a subset of semi-monocoque construction may be unibody construction. Unibody, which is short for "unitized body" or alternatively "unitary construction," vehicles are characterized by a construction in which body, floor plan, and chassis form a single structure, for example an automobile. In the aircraft world, a unibody may include internal structural elements, like formers and stringers, constructed in one piece, integral to an aircraft skin. In some cases, stringers and formers may account for a bulk of any aircraft structure (excluding monocoque construction). Stringers and formers can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

With continued reference to FIG. 6, in some cases, a primary purpose for a substructure of a semi-monocoque structure is to stabilize a skin. Typically, aircraft structure is required to have a very light weight and as a result, in some cases, aircraft skin may be very thin. In some cases, unless supported, this thin skin structure may tend to buckle and/or cripple under compressive and/or shear loads. In some cases, underlying structure may be primarily configured to stabilize skins. For example, in an exemplary conventional airliner, wing structure is an airfoil-shaped box with truncated nose and aft triangle; without stabilizing substructure, in some cases, this box would buckle upper skin of the wing and the upper skin would also collapse into the lower skin under bending loads. In some cases, deformations are prevented with ribs that support stringers which stabilize the skin. Fuselages are similar with bulkheads or frames, and stringers.

With continued reference to FIG. 6, in some embodiments, another common structural form is sandwich structure. As used in this disclosure, "sandwich structure" refers to a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some cases, sandwich structure can be popular on composite light airplanes, such as gliders and powered light planes. In some cases, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

With continued reference to FIG. 6, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 604. In some cases, monocoque may be considered to include substantially only structural skin, and in that sense, aircraft skin undergoes stress by applied aerodynamic fluids imparted by fluid. Stress as used in continuum mechanics can be described in pound-force per square inch (lbf/in²) or Pascals (Pa). In semi-monocoque construction stressed skin bears part of aerodynamic loads and additionally imparts force on an underlying structure of stringers and formers.

With continued reference to FIG. 6, a fuselage may include an interior cavity. An interior cavity may include a volumetric space configured to house passenger seats and/or cargo. An interior cavity may be configured to include receptacles for fuel stores, batteries, fuel cells, or other energy sources as described herein. In some cases, a post may be supporting a floor (i.e., deck), or in other words a surface on which a passenger, operator, passenger, payload, or other object would rest on due to gravity when within an aircraft 600 is in its level flight orientation or sitting on ground. A post may act similarly to stringer in that it is configured to support axial loads in compression due to a load being applied parallel to its axis due to, for example, a heavy object being placed on a floor of aircraft 600. A beam may be disposed in or on any portion a fuselage that requires additional bracing, specifically when disposed transverse to another structural element, like a post, that would benefit from support in that direction, opposing applied force. A beam may be disposed in a plurality of locations and orientations within a fuselage as necessitated by operational and constructional requirements.

With continued reference to FIG. 6, aircraft 600 may include at least a flight component 608. A flight component 608 may be consistent with any description of a flight component described in this disclosure, such as without limitation propulsors, control surfaces, rotors, engines, propellers, wings, winglets, or the like. For the purposes of this disclosure, at least a "flight component" is at least one element of an aircraft 600 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of aircraft 600. In some embodiments, at least a flight component 608 may include a propulsor, for example a rotor attached to an electric motor configured to produce shaft torque and in turn, create thrust. As used in this disclosure, an "electric motor" is an electrical machine that converts electric energy into mechanical work.

Still referring to FIG. 6, in some embodiments, a flight component may include an engine. Engine may include an engine assembly. An "engine assembly," as used herein, is a mechanical assembly including all of the constituent parts of an engine. Engine assembly may include, as non-limiting examples, a fan, gearbox such as a reduction gearbox, an engine core, and/or the like. An engine may include embodiments as described in U.S. Non-provisional application Ser. No. 17/601,492 filed on Oct. 14, 2021, and entitled "DRAG RECOVERY SCHEME USING BOUNDARY LAYER INGESTION," and U.S. Non-provisional application Ser. No. 18/102,342 filed on Jan. 27, 2023, and entitled "APPARATUS FOR INGESTING BOUNDARY LAYER FLOW FOR AN AIRCRAFT," the entirety of both of which are incorporated herein by reference. In some embodiments, an engine may include a turbine. As used herein, a "turbine" is a machine which propels an aircraft through use of a rotor affixed to one or more vanes. In some embodiments, an engine, such as a turbine, may be configured to propel aircraft 600 forward while aircraft 600 is airborne.

Still referring to FIG. 6, in some embodiments, an engine may be positioned in order to avoid damage to other critical components of aircraft 600 in the event of engine failure. In some embodiments, engine may be positioned towards the rear of aircraft 600. In some embodiments, engine may be positioned on top of main body of aircraft 600. In some embodiments, aircraft 600 may include multiple engines, each of which is positioned towards rear of aircraft 600 and/or on top of main body of aircraft 600.

Still referring to FIG. 6, in some embodiments, engine may be mounted aft of rear spar and/or rear pressure bulkhead. In some embodiments, such positioning may result in reduced likelihood that engine failure results in puncture of the pressure vessel. In some embodiments, fuel stores may be located forward of and/or below engine. In some embodiments, such positioning may allow fuel store to avoid debris from engine failure. In some embodiments, such positioning may leave only top of fuel store within a potential debris field. This may limit fuel loss by reducing the likelihood that debris punctures bottom of fuel store which may create a leak. In some embodiments, aircraft 600 may include a plurality of fuel stores such that damage to a single fuel store may not compromise fuel in other fuel stores. In some embodiments, a turbine may be placed using the same considerations laid out herein with respect to engine placement. This may limit the likelihood of, for example, a turbine blade from piercing pressure vessel upon turbine failure.

Still referring to FIG. 6, as used herein, a "lateral" direction of an aircraft is a direction running in a straight line from wing tip to wing tip. Lateral direction may be orthogonal to longitudinal direction. As used herein, a "longitudinal" direction of an aircraft is a direction running in a straight line from nose to tail of the aircraft. As used herein, "fore" and "forward" are used interchangeably to mean a direction from an aircraft tail to an aircraft nose along a longitudinal axis. As used herein, "aft" and "rear" are used interchangeably to mean a direction from an aircraft nose to an aircraft tail along a longitudinal axis.

Still referring to FIG. 6, where it is said that a first component is in a direction of a second component herein, this means that the first component is located in that direction of a plane perpendicular to a line in the specified direction. Unless specified otherwise, where it is said that a first component is in a direction of a second component herein, this means that the entirety of the first component is in the specified direction relative to the entirety of the second component. For example, if it is said that an engine is above a fuel store, then, unless specified otherwise, the entirety of the engine is above the entirety of the fuel store along a vertical axis, but this does not mean or imply any relationship between the engine or the fuel store along a horizontal axis.

Still referring to FIG. 6, where a first component is not completely in a direction of another (i.e., where there is overlap in their ranges on the relevant axis), the degree to which a component is in a direction of another is measured by, unless specified otherwise, volume. For example, if 50% of an engine is said to be aft of 70% of a pressure vessel, then, unless specified otherwise, that means 50% of the volume of the engine is aft of 70% of the volume of the pressure vessel.

Still referring to FIG. 6, in some embodiments, engine may be positioned aft of rear pressure bulkhead. In some embodiments, at least 10%, 20%, 30%, 40%, 50%, 60%, 70%, 80%, 90%, or 100% of engine may be positioned aft of rear pressure bulkhead. In some embodiments, the entirety of each engine of aircraft 600 may be positioned aft of rear pressure bulkhead. In some embodiments, at least 10%, 20%, 30%, 40%, 50%, 60%, 70%, 80%, 90%, or 100% of each engine of aircraft 600 may be positioned aft of rear pressure bulkhead.

Still referring to FIG. 6, in some embodiments, engine may be positioned aft of pressure vessel. In some embodiments, at least 10%, 20%, 30%, 40%, 50%, 60%, 70%, 80%, 90%, or 100% of engine may be positioned aft of pressure vessel. In some embodiments, the entirety of each engine of aircraft 600 may be positioned aft of pressure vessel. In some embodiments, at least 10%, 20%, 30%, 40%, 50%, 60%, 70%, 80%, 90%, or 100% of each engine of aircraft 600 may be positioned aft of pressure vessel. In some embodiments, at least 10%, 20%, 30%, 40%, 50%, 60%, 70%, 80%, 90%, or 100% of engine may be positioned aft of at least 10%, 20%, 30%, 40%, 50%, 60%, 70%, 80%, 90%, or 100% of pressure vessel.

Still referring to FIG. 6, in some embodiments, engine may be positioned aft of rear spar. In some embodiments, at least 10%, 20%, 30%, 40%, 50%, 60%, 70%, 80%, 90%, or 100% of engine may be positioned aft of rear spar. In some embodiments, the entirety of each engine of aircraft 600 may be positioned aft of rear spar. In some embodiments, at least 10%, 20%, 30%, 40%, 50%, 60%, 70%, 80%, 90%, or 100% of each engine of aircraft 600 may be positioned aft of rear spar.

Still referring to FIG. 6, in some embodiments, engine may be positioned aft of fuel store. In some embodiments, at least 10%, 20%, 30%, 40%, 50%, 60%, 70%, 80%, 90%, or 100% of engine may be positioned aft of fuel store. In some embodiments, the entirety of each engine of aircraft 600 may be positioned aft of fuel store. In some embodiments, at least 10%, 20%, 30%, 40%, 50%, 60%, 70%, 80%, 90%, or 100% of each engine of aircraft 600 may be positioned aft of fuel store. In some embodiments, at least 10%, 20%, 30%, 40%, 50%, 60%, 70%, 80%, 90%, or 100% of engine may be positioned aft of at least 10%, 20%, 30%, 40%, 50%, 60%, 70%, 80%, 90%, or 100% of fuel store. In some embodiments, at least 10%, 20%, 30%, 40%, 50%, 60%, 70%, 80%, 90%, or 100% of fuel is stored aft of engine.

Still referring to FIG. 6, in some embodiments, engine may be positioned above fuel store. In some embodiments, at least 10%, 20%, 30%, 40%, 50%, 60%, 70%, 80%, 90%, or 100% of engine may be positioned above fuel store. In some embodiments, the entirety of each engine of aircraft 600 may be positioned above fuel store. In some embodiments, at least 10%, 20%, 30%, 40%, 50%, 60%, 70%, 80%, 90%, or 100% of each engine of aircraft 600 may be positioned above fuel store. In some embodiments, at least 10%, 20%, 30%, 40%, 50%, 60%, 70%, 80%, 90%, or 100% of engine may be positioned above at least 10%, 20%, 30%, 40%, 50%, 60%, 70%, 80%, 90%, or 100% of fuel store. In some embodiments, at least 10%, 20%, 30%, 40%, 50%, 60%, 70%, 80%, 90%, or 100% of fuel is stored below engine.

With continued reference to FIG. 6, for the purposes of this disclosure, "torque," is a twisting force that tends to cause rotation. Torque may be considered an effort and a rotational analogue to linear force. A magnitude of torque of a rigid body may depend on three quantities: a force applied, a lever arm vector connecting a point about which the torque is being measured to a point of force application, and an angle between the force and the lever arm vector. A force applied perpendicularly to a lever multiplied by its distance from the lever's fulcrum (the length of the lever arm) is its torque. A force of three newtons applied two meters from the fulcrum, for example, exerts the same torque as a force of one newton applied six meters from the fulcrum. In some cases, direction of a torque can be determined by using a right-hand grip rule which states: if fingers of right hand are curled from a direction of lever arm to direction of force, then thumb points in a direction of the torque. One of ordinary skill in the art would appreciate that torque may be represented as a vector, consistent with this disclosure, and therefore may include a magnitude and a direction. "Torque" and "moment" are used interchangeably within this disclosure. Any torque command or signal within this disclosure may include at least the steady state torque to achieve the torque output to at least a propulsor.

With continued reference to FIG. 6, at least a flight component may be one or more devices configured to affect aircraft's 100 attitude. "Attitude," for the purposes of this disclosure, is the relative orientation of a body, in this case aircraft 600, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to aircraft 600. A plurality of attitude datums may indicate one or more measurements relative to an aircraft's pitch, roll, yaw, or throttle compared to a relative starting point. One or more sensors may measure or detect an aircraft's 100 attitude and establish one or more attitude datums. An "attitude datum," for the purposes of this disclosure, refers to at least an element of data identifying an attitude of an aircraft 600.

With continued reference to FIG. 6, in some cases, aircraft 600 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

With continued reference to FIG. 6, in some cases, aircraft 600 may include at least a pilot control. As used in this disclosure, a "pilot control," is an interface device that allows an operator, human or machine, to control a flight component of an aircraft. Pilot control may be communicatively connected to any other component presented in aircraft 600, the communicative connection may include redundant connections configured to safeguard against single-point failure. In some cases, a plurality of attitude datums may indicate a pilot's instruction to change heading and/or trim of an aircraft 600. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. "Pitch," for the purposes of this disclosure refers to an aircraft's angle of attack, which is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down," when its nose is angled downward compared to horizontal flight, like in a dive maneuver. In some cases, angle of attack may not be used as an input, for instance pilot input, to any system disclosed herein; in such circumstances proxies may be used such as pilot controls, remote controls, or sensor levels, such as true airspeed sensors, pitot tubes, pneumatic/hydraulic sensors, and the like. "Roll" for the purposes of this disclosure refers to an aircraft's position about its longitudinal axis, which is to say that when an aircraft rotates about its axis from its tail to its nose, and one side rolls upward, as in a banking maneuver. "Yaw," for the purposes of this disclosure, refers to an aircraft's turn angle, when an aircraft rotates about an imaginary vertical axis intersecting center of earth and aircraft 600. "Throttle," for the purposes of this disclosure, refers to an aircraft outputting an amount of thrust from a propulsor. In context of a pilot input, throttle may refer to a pilot's input to increase or decrease thrust produced by at least a propulsor. Flight components 608 may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may determine as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

With continued reference to FIG. 6, in some embodiments, pilot control may include at least a sensor. As used in this disclosure, a "sensor" is a device that detects a phenomenon. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component 608. At least a flight component 608 may include any propulsor as described herein. In embodiment, at least a flight component 608 may include an electric motor, a propeller, a jet engine, a paddle wheel, a rotor, turbine, or any other mechanism configured to manipulate a fluid medium to propel an aircraft as described herein. an embodiment of at least a sensor may include or be included in, a sensor suite. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

With continued reference to FIG. 6, at least a sensor may include a moisture sensor. "Moisture," as used in this disclosure, is the presence of water, this may include vaporized water in air, condensation on the surfaces of objects, or concentrations of liquid water. Moisture may include humidity. "Humidity," as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity," for the purposes of this disclosure, is expressed as a percentage, indicating a present stat of absolute humidity relative to a maximum humidity given the same temperature. "Specific humidity," for the purposes of this disclosure, is the ratio of water vapor mass to total moist air parcel mass, where parcel is a given portion of a gaseous medium. A moisture sensor may be psychrometer. A moisture sensor may be a hygrometer. A moisture sensor may be configured to act as or include a humidistat. A "humidistat," for the purposes of this disclosure, is a humidity-triggered switch, often used to control another electronic device. A moisture sensor may use capacitance to measure relative humidity and include in itself, or as an external component, include a device to convert relative humidity measurements to absolute humidity measurements. "Capacitance," for the purposes of this disclosure, is the ability of a system to store an electric charge, in this case the system is a parcel of air which may be near, adjacent to, or above a battery cell.

With continued reference to FIG. 6, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. "Motion sensor," for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy being configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings.

With continued reference to FIG. 6, at least a flight component 608 may include wings, empennages, nacelles, control surfaces, fuselages, and landing gear, among others, to name a few. In embodiments, an empennage may be disposed at the aftmost point of an aircraft body. Empennage may comprise a tail of aircraft 600, further comprising rudders, vertical stabilizers, horizontal stabilizers, stabilators, elevators, trim tabs, among others. At least a portion of empennage may be manipulated directly or indirectly by pilot commands to impart control forces on a fluid in which the aircraft 600 is flying. Manipulation of these empennage control surfaces may, in part, change an aircraft's heading in pitch, roll, and yaw. Wings comprise may include structures which include airfoils configured to create a pressure differential resulting in lift. Wings are generally disposed on a left and right side of aircraft 600 symmetrically, at a point between nose and empennage. Wings may comprise a plurality of geometries in planform view, swept swing, tapered, variable swing, triangular, oblong, elliptical, square, among others. Wings may be blended into the body of the aircraft such as in a BWB 604 aircraft 600 where no strong delineation of body and wing exists. A wing's cross section geometry may comprise an airfoil. An "airfoil" as used in this disclosure, is a shape specifically designed such that a fluid flowing on opposing sides of it exert differing levels of pressure against the airfoil. In embodiments, a bottom surface of an aircraft can be configured to generate a greater pressure than does a top surface, resulting in lift. A wing may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings may comprise controls surfaces configured to be commanded by a pilot and/or autopilot to change a wing's geometry and therefore its interaction with a fluid medium. Flight component 608 may include control surfaces. Control surfaces may include without limitation flaps, ailerons, tabs, spoilers, and slats, among others. In some cases, control surfaces may be disposed on wings in a plurality of locations and arrangements. In some cases, control surfaces may be disposed at leading and/or trailing edges of wings, and may be configured to deflect up, down, forward, aft, or any combination thereof.

With continued reference to FIG. 6, in some cases, flight component 608 may include a winglet. For the purposes of this disclosure, a "winglet" is a flight component configured to manipulate a fluid medium and is mechanically attached to a wing or aircraft and may alternatively called a "wingtip device." Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices can also improve aircraft handling characteristics and enhance safety for aircraft 600. Such devices increase an effective aspect ratio of a wing without greatly increasing wingspan. Extending wingspan may lower lift-induced drag, but would increase parasitic drag and would require boosting the strength and weight of the wing. As a result according to some aeronautic design equations, a maximum wingspan made be determined above which no net benefit exits from further increased span. There may also be operational considerations that limit the allowable wingspan (e.g., available width at airport gates).

With continued reference to FIG. 6, wingtip devices, in some cases, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. U.S. Air Force studies indicate that a given improvement in fuel efficiency correlates directly and causally with increase in an aircraft's lift-to-drag ratio. The term "winglet" has previously been used to describe an additional lifting surface on an aircraft, like a short section between wheels on fixed undercarriage. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to the close-hauled sailboat's sails, winglets may convert some of what would otherwise-be wasted energy in a wingtip vortex to an apparent thrust. This small contribution can be worthwhile over the aircraft's lifetime. Another potential benefit of winglets is that they may reduce an intensity of wake vortices. Wake vortices may trail behind an aircraft 600 and pose a hazard to other aircraft. Minimum spacing requirements between aircraft at airports are largely dictated by hazards, like those from wake vortices. Aircraft are classified by weight (e.g., "Light," "Heavy," and the like) often base upon vortex strength, which grows with an aircraft's lift coefficient. Thus, associated turbulence is greatest at low speed and high weight, which may be produced at high angle of attack near airports. Winglets and wingtip fences may also increase efficiency by reducing vortex interference with laminar airflow near wingtips, by moving a confluence of low-pressure air (over wing) and high-pressure air (under wing) away from a surface of the wing. Wingtip vortices create turbulence, which may originate at a leading edge of a wingtip and propagate backwards and inboard. This turbulence may delaminate airflow over a small triangular section of an outboard wing, thereby frustrating lift in that area. A fence/winglet drives an area where a vortex forms upward away from a wing surface, as the resulting vortex is repositioned to a top tip of the winglet.

With continued reference to FIG. 6, aircraft 600 may include an energy source. Energy source may include any device providing energy to at least a flight component 608, for example at least a propulsors. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. The energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In embodiments, the energy source may be used to provide electrical power to an electric or hybrid propulsor during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

With continued reference to FIG. 6, in further nonlimiting embodiments, an energy source may include a fuel store. As used in this disclosure, a "fuel store" is an aircraft component configured to store a fuel. In some cases, a fuel store may include a fuel tank. Fuel may include a liquid fuel, a gaseous fluid, a solid fuel, and fluid fuel, a plasma fuel, and the like. As used in this disclosure, a "fuel" may include any substance that stores energy. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. As described in greater detail below fuel store may be located substantially within blended wing body 604 of aircraft 600, for example without limitation within a wing portion of blended wing body. Aviation fuels may include petroleum-based fuels, or petroleum and synthetic fuel blends, used to power aircraft 600. In some cases, aviation fuels may have more stringent requirements than fuels used for ground use, such as heating and road transport. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for an aircraft 600. Liquid fuel may include Jet-A. Presently Jet-A powers modern commercial airliners and is a mix of extremely refined kerosene and burns at temperatures at or above 49° C. (120° F.). Kerosene-based fuel has a much higher flash point than gasoline-based fuel, meaning that it requires significantly higher temperature to ignite.

Still referring to FIG. 6, in some embodiments, aircraft 600 may include a fuel store and fuel store may be positioned in a transition portion of blended wing body between the main body and a wing. In some embodiments, a first fuel store is positioned in a transition portion of blended wing body between main body and port wing, and a second fuel store is positioned in a transition portion of blended wing body between main body and starboard wing.

With continued reference to FIG. 6, modular aircraft 600 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

With continued reference to FIG. 6, in some embodiments, fuel cells may consist of different types. Commonly a fuel cell consists of an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 1 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked," or placed in series, to create sufficient voltage to meet an application's requirements. In addition to electricity, fuel cells may produce water, heat and, depending on the fuel source, very small amounts of nitrogen dioxide and other emissions. Energy efficiency of a fuel cell is generally between 40 and 90%.

With continued reference to FIG. 6, fuel cell may include an electrolyte. In some cases, electrolyte may define a type of fuel cell. Electrolyte may include any number of substances like potassium hydroxide, salt carbonates, and phosphoric acid. Commonly a fuel cell is fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. A fuel cell may include gas diffusion layers that are designed to resist oxidization.

With continued reference to FIG. 6, fuel cell may necessitate storage of fuel, such as liquified gas.

With continued reference to FIG. 6, aircraft 600 may include an energy source which may include a cell such as a battery cell, or a plurality of battery cells making a battery module. An energy source may be a plurality of energy sources. The module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source may include a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

With continued reference to FIG. 6, aircraft 600 may include multiple flight component 608 sub-systems, each of which may have a separate energy source. For instance, and without limitation, one or more flight components 608 may have a dedicated energy source. Alternatively, or additionally, a plurality of energy sources may each provide power to two or more flight components 608, such as, without limitation, a "fore" energy source providing power to flight components located toward a front of an aircraft 600, while an "aft" energy source provides power to flight components located toward a rear of the aircraft 600. As a further non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to the same single propulsor or plurality of propulsors. Alternatively, or additionally, two or more separate propulsion subsystems may be joined using intertie switches (not shown) causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

With continued reference to FIG. 6, aircraft 600 may include a flight component 608 that includes at least a nacelle. When attached by a pylon entirely outside an airframe a nacelle may sometimes be referred to as a pod, in which case an engine within the nacelle may be referred to as a podded engine. In some cases an aircraft cockpit may also be housed in a nacelle, rather than in a conventional fuselage. At least a nacelle may substantially encapsulate a propulsor, which may include a motor or an engine. At least a nacelle may be mechanically connected to at least a portion of aircraft 600 partially or wholly enveloped by an outer mold line of the aircraft 600. At least a nacelle may be designed to be streamlined. At least a nacelle may be asymmetrical about a plane comprising the longitudinal axis of the engine and the yaw axis of modular aircraft 600.

With continued reference to FIG. 6, a flight component may include a propulsor. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

With continued reference to FIG. 6, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

With continued reference to FIG. 6, in nonlimiting embodiments, at least a flight component 608 may include an airbreathing engine such as a jet engine, turbojet engine, turboshaft engine, ramjet engine, scramjet engine, hybrid propulsion system, turbofan engine, or the like. At least a flight component 608 may be fueled by any fuel described in this disclosure, for instance without limitation Jet-A, Jet-B, diesel fuel, gasoline, or the like. In nonlimiting embodiments, a jet engine is a type of reaction engine discharging a fast-moving jet that generates thrust by jet propulsion. While this broad definition can include rocket, water jet, and hybrid propulsion, the term jet engine, in some cases, refers to an internal combustion airbreathing jet engine such as a turbojet, turbofan, ramjet, or pulse jet. In general, jet engines are internal combustion engines. As used in this disclosure, a "combustion engine" is a mechanical device that is configured to convert mechanical work from heat produced by combustion of a fuel. In some cases, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. An internal combustion engine may include heat engine in which combustion of fuel occurs with an oxidizer (usually air) in a combustion chamber that comprises a part of a working fluid flow circuit. Exemplary internal combustion engines may without limitation be a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. Early jet aircraft used turbojet engines that were relatively inefficient for subsonic flight. Most modern subsonic jet aircraft use more complex high-bypass turbofan engines. In some cases, they give higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. Alternatively and/or additionally, jet engine may include a turbojets. In some cases, a turbofan may use a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression. Persons skilled in the art, upon reviewing the entirety of this disclosure, will be aware of various devices that may be used as a thrust element.

With continued reference to FIG. 6, an aircraft 600 may include a flight controller. As used in this disclosure, a "flight controller" is a device that generates signals for controlling at least a flight component 608 of an aircraft 600. In some cases, a flight controller includes electronic circuitry, such as without limitation a digital signal processor (DSP), an application-specific integrated circuit (ASIC), and/or a computing device. Flight controller may use sensor feedback to calculate performance parameters of motor, including without limitation a torque versus speed operation envelope. Persons skilled in the art, upon reviewing the entirety of this disclosure, will be aware of various devices and/or components that may be used as or included in a motor or a circuit operating a motor, as used and described in this disclosure.

With continued reference to FIG. 6, computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented using a "shared nothing" architecture in which data is cached at the worker, in an embodiment, this may enable scalability of system and/or computing device.

With continued reference to FIG. 6, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 6, in some embodiments, aircraft 600 may include landing gear such as tilting landing gear and/or cabin stowed landing gear. Landing gear may be consistent with any landing gear disclosed in U.S. patent application Ser. No. 17/868,483, filed on Jul. 19, 2022, and titled "TILTING LANDING GEAR SYSTEMS AND METHODS," U.S. patent application Ser. No. 16/830,608, filed on Dec. 30, 2019, and titled "SWING-ARM PIVOT PISTON LANDING GEAR SYSTEMS AND METHODS," U.S. patent application Ser. No. 17/873,865, filed on Jul. 26, 2022, and titled "TILTING LANDING GEAR SYSTEMS AND METHODS," U.S. patent application Ser. No. 17/758,824, filed on Oct. 3, 2022, and titled "AN AIRCRAFT WITH CABIN-STOWED LANDING GEAR," the entirety of each of which is hereby incorporated by reference.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
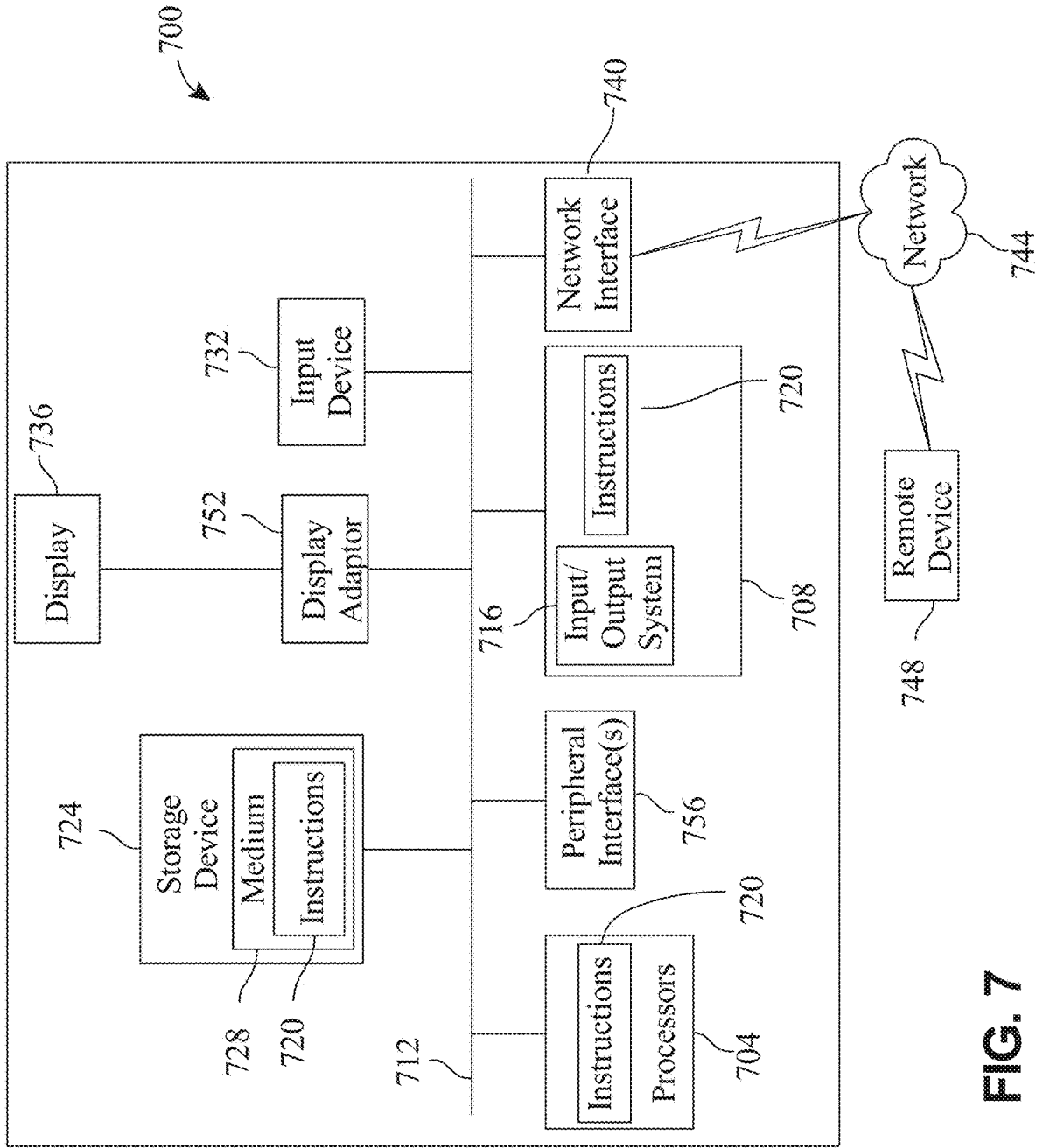
FIG. 7 illustrates a block diagram of a computing system that can be used to implement any one or more of the methodologies disclosed herein and any one or more portions thereof. The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740 may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An aircraft with a well for engine displacement, the aircraft comprising:
   at least an engine, wherein the at least an engine is top mounted to the aircraft;
   a main body;
   at least an engine support structure mechanically connecting the at least an engine with the main body, wherein the at least an engine support structure comprises one or more sides of the well; and
   the well extending from an upper surface of the aircraft toward a lower surface of the aircraft, wherein the well is configured to allow for a vertical displacement of the at least an engine from the at least an engine support structure.

2. The aircraft of claim 1, wherein the at least an engine is positioned directly above at least a landing gear system of the aircraft.

3. The aircraft of claim 1, wherein the at least an engine support structure comprises a plurality of hoop structures, wherein each hoop structure of the plurality of hoop structures comprises a horseshoe structure.

4. The aircraft of claim 3, wherein at least one horseshoe structure of the plurality of horseshoe structures is located forward of a center of gravity of an engine assembly of the at least an engine.

5. The aircraft of claim 3, wherein the plurality of hoop structures is connected to one or more ribs at an aft face of a pressure vessel.

6. The aircraft of claim 5, wherein the one or more ribs comprise a gap between the one or more ribs.

7. The aircraft of claim 1, wherein the at least an engine is configured to be released in response to a deployment signal when at least a landing gear system is fully extended.

8. The aircraft of claim 7, wherein the deployment signal is generated when the aircraft is situated on a ground surface and the well is unoccupied.

9. The aircraft of claim 7, wherein the deployment signal is generated upon a receipt of a pilot-initiated input.

10. The aircraft of claim 1, wherein the at least an engine is vertically displaced from the at least an engine support structure when at least a landing gear system is extended.

11. The aircraft of claim 1, wherein the well comprises a landing gear well.

12. The aircraft of claim 1, wherein the at least an engine is mounted aft of a rear spar.

13. The aircraft of claim 1, wherein the at least an engine support structure is mounted to an upper surface of the main body.

14. The aircraft of claim 1, wherein the well is configured to house at least a landing gear system during flight.

15. The aircraft of claim 1, wherein a first engine support structure of the at least an engine support structure is attached to a first engine of the at least an engine and a second engine support structure of the at least an engine support structure is attached to a second engine of the at least an engine.

16. The aircraft of claim 1, wherein the aircraft comprises a blended wing body.

17. An aircraft with a well for engine displacement, the aircraft comprising:
   at least an engine, wherein the at least an engine is top mounted to the aircraft;
   a main body;
   at least an engine support structure mechanically connecting the at least an engine with the main body, wherein the at least an engine support structure comprises a plurality of hoop structures, wherein each hoop structure of the plurality of hoop structures comprises a horseshoe structure and wherein at least one horseshoe structure of the plurality of horseshoe structures is located forward of a center of gravity of an engine assembly of the at least an engine; and
   the well extending from an upper surface of the aircraft toward a lower surface of the aircraft, wherein the well is configured to allow for a vertical displacement of the at least an engine from the at least an engine support structure.

18. An aircraft with a well for engine displacement, the aircraft comprising:
   at least an engine, wherein the at least an engine is top mounted to the aircraft;
   a main body;
   at least an engine support structure mechanically connecting the at least an engine with the main body; and
   a landing gear well extending from an opening at an upper surface of the aircraft and through an opening at a lower surface of the aircraft, wherein the landing gear well is configured to house a landing gear system and configured to allow for a vertical displacement of the at least an engine from the at least an engine support structure and through the landing gear well.

19. The aircraft of claim 18, wherein the at least an engine is mounted aft of a rear spar.

20. The aircraft of claim 18, wherein the at least an engine is configured to be released in response to a deployment signal when the at least a landing gear system is fully extended.

* * * * *